(12) United States Patent
Rossle et al.

(10) Patent No.: US 10,858,377 B2
(45) Date of Patent: Dec. 8, 2020

(54) MULTIVINYLAMINOSILANES AS BRANCHING AGENTS FOR FUNCTIONALIZED ELASTOMERIC POLYMERS

(71) Applicant: Trinseo Europe GMBH, Horgen (CH)

(72) Inventors: Michael Rossle, Merseburg (DE); Christian Doring, Markranstadt (DE); Sven Thiele, Halle (DE); Dominique Thielemann, Leipzig (DE)

(73) Assignee: TRINSEO EUROPE GMBH, Horgen (CH)

( * ) Notice: Subject to any disclaimer, the term of this patent is extended or adjusted under 35 U.S.C. 154(b) by 93 days.

(21) Appl. No.: 15/551,519

(22) PCT Filed: Jan. 20, 2016

(86) PCT No.: PCT/EP2016/051086
§ 371 (c)(1),
(2) Date: Aug. 16, 2017

(87) PCT Pub. No.: WO2016/131590
PCT Pub. Date: Aug. 25, 2016

(65) Prior Publication Data
US 2018/0030070 A1   Feb. 1, 2018

(30) Foreign Application Priority Data

Feb. 18, 2015   (EP) .................................... 15155545

(51) Int. Cl.
| | | |
|---|---|---|
| *C07F 7/10* | (2006.01) | |
| *C08F 236/10* | (2006.01) | |
| *C07F 7/21* | (2006.01) | |
| *C08F 36/06* | (2006.01) | |
| *C08F 36/08* | (2006.01) | |
| *C08L 21/00* | (2006.01) | |
| *C08L 9/06* | (2006.01) | |
| *C07F 7/08* | (2006.01) | |
| *C08F 293/00* | (2006.01) | |
| *C08J 3/24* | (2006.01) | |
| *C08K 3/04* | (2006.01) | |
| *C08K 3/36* | (2006.01) | |
| *C08F 230/08* | (2006.01) | |

(52) U.S. Cl.
CPC .............. *C07F 7/10* (2013.01); *C07F 7/0801* (2013.01); *C07F 7/21* (2013.01); *C08F 36/06* (2013.01); *C08F 36/08* (2013.01); *C08F 236/10* (2013.01); *C08F 293/005* (2013.01); *C08J 3/24* (2013.01); *C08K 3/04* (2013.01); *C08K 3/36* (2013.01); *C08L 9/06* (2013.01); *C08L 21/00* (2013.01); *C08F 230/08* (2013.01); *C08F 2438/00* (2013.01); *C08F 2810/20* (2013.01); *C08J 2347/00* (2013.01)

(58) Field of Classification Search
CPC ........ C07F 7/10; C07F 7/0807; C08F 236/10; C08F 297/04
See application file for complete search history.

(56) References Cited

U.S. PATENT DOCUMENTS

| | | |
|---|---|---|
| 3,078,254 A | 2/1963 | Zelinski et al. |
| 3,244,664 A | 4/1966 | Zelinski et al. |
| 3,281,383 A | 10/1966 | Zelinski et al. |
| 3,485,857 A * | 12/1969 | Speier ...................... C07F 7/10 556/12 |
| 3,692,874 A | 9/1972 | Farrar et al. |
| 3,978,103 A | 8/1976 | Meyer-Simon et al. |
| 4,048,206 A | 9/1977 | Voronkov et al. |
| 4,474,908 A | 10/1984 | Wagner |
| 4,616,069 A | 10/1986 | Watanabe et al. |
| 6,229,036 B1 | 5/2001 | Batz-Sohn et al. |
| 6,777,569 B1 | 8/2004 | Westmeyer et al. |
| 8,299,167 B2 | 10/2012 | Oshima |
| 2005/0124740 A1 | 6/2005 | Klockmann et al. |
| 2005/0159513 A1 | 7/2005 | Henning et al. |
| 2013/0131263 A1 | 5/2013 | Nebhani et al. |

FOREIGN PATENT DOCUMENTS

| | | |
|---|---|---|
| GB | 1256704 | 12/1971 |
| GB | 1294682 | 11/1972 |
| JP | 2011-089186 A | 5/2011 |
| SU | 323006 | 4/1970 |
| WO | WO 2007/047943 | 4/2007 |
| WO | WO 2009/148932 | 12/2009 |
| WO | WO 2010/049261 | 5/2010 |
| WO | WO 2011/028523 | 3/2011 |
| WO | WO 2012/091753 | 7/2012 |
| WO | WO 2014/040639 | 3/2014 |

(Continued)

OTHER PUBLICATIONS

Office Action in European Application No. 15155545.5, dated Jan. 26, 2018, 4 pages.

(Continued)

*Primary Examiner* — Kuo Liang Peng

(74) *Attorney, Agent, or Firm* — Barnes & Thornburg LLP; G. Peter Nichols

(57) ABSTRACT

Novel polymerizable multivinylaminosilanes which are useful as branching agents for synthetic and natural rubber are described. The compounds can be used in the polymerization of conjugated diene monomers, optionally together with aromatic vinyl monomers, thus producing polymers, which can favorably be used in rubber articles such as tires.

21 Claims, 1 Drawing Sheet

(56) References Cited

FOREIGN PATENT DOCUMENTS

WO     WO 2014/040640     3/2014
WO     WO 2015/010710 A1     1/2015

OTHER PUBLICATIONS

Pawluc et al., "Novel Highly Stereoselective Approach Toward (Z)-I, 2-Bis(silyl)ethenes", *Synthesis*, vol. 21, Feb. 2002, pp. 3739-3745.
International Search Report in corresponding International Application No. PCT/EP2016/051086, dated Apr. 26, 2016, 3 pages.
Written Opinion out of corresponding International Application No PCT/EP2016/051086, dated Apr. 26, 2016, 6 pages.
Dautel et al., "Hydrosilylation and hydroboration of indene—a comparison," Organosilicon Chemistry IV, 2000, p. 200-206.
Veith et al., Synthesis of Dendrimers with a N—Si—C Framework, Organometallics, 1999, vol. 18, No. 4, p. 656-661.
Xiao et al., "Synthetic Approaches to Cyclodisilazanes and Branched Silazanes," Organometallics, 2004, vol. 23, No. 19, p. 4438-4443.
Zhang et al., "Synthesis and characterization of hyperbranched polycarbosilazanes with controllable degradation behavior," Gaofenzi Xuebao, 2007, No. 8, p. 780-784 (Abstract).
Office Action issued in Application No. JP2017-543974 (dated Oct. 2019).

\* cited by examiner

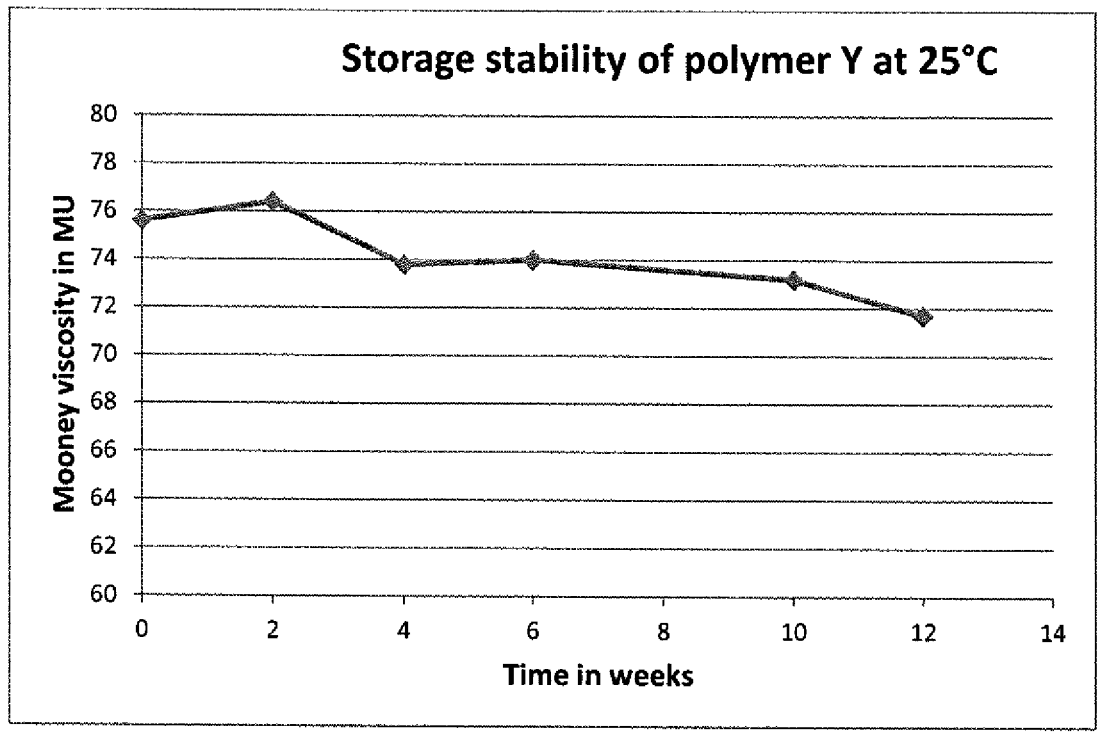

MULTIVINYLAMINOSILANES AS BRANCHING AGENTS FOR FUNCTIONALIZED ELASTOMERIC POLYMERS

This application claims priority to International Application No. PCT/EP2016/051086 filed Jan. 20, 2016 and to European Application No. 15155545.5 filed Feb. 18, 2015; the entire contents of each are incorporated herein by reference.

FIELD OF THE INVENTION

The present invention is directed to novel multivinylaminosilanes which are useful as branching agents in the polymerization of conjugated diene monomers, optionally together with aromatic vinyl monomers, thus producing polymers, specifically elastomeric polymers, which can favorably be used in rubber articles such as tires.

BACKGROUND OF THE INVENTION

Increasing oil prices and national legislation requiring the reduction of automotive carbon dioxide emissions force tire and rubber producers to produce "fuel-efficient" and thus fuel-saving tires. One approach for obtaining fuel-efficient tires lies in the production of tire formulations having reduced hysteresis loss. The hysteresis loss of a crosslinked elastomeric polymer composition is related to its tan δ value at 60° C. (see ISO 4664-1:2005; Rubber, Vulcanized or thermoplastic; Determination of dynamic properties—part 1: General guidance). In general, vulcanized elastomeric polymer compositions having relatively low tan δ values at 60° C. are preferred as having lower hysteresis loss. In the final tire product, this translates into a lower rolling resistance and better fuel economy. In contrast, a lower tan δ value at 0° C. corresponds to a deteriorated wet grip of the tire product. Thus, it is generally accepted that a lower rolling resistance tire can be made at the expense of deteriorated wet grip properties. For example, if, in a random solution styrene-butadiene rubber (random SSBR), the polystyrene unit concentration is reduced with respect to the total polybutadiene unit concentration, the SSBR glass transition temperature is reduced and, as a result, both tan δ at 60° C. and tan δ at 0° C. are reduced, generally corresponding to improved rolling resistance and deteriorated wet grip performance of the tire. Accordingly, when assessing the rubber vulcanizate performance correctly, both tan δ at 60° C. and tan δ at 0° C. should be monitored along with the tire heat build-up.

WO 2012/091753 relates to silane-functionalized polymers and rubber vulcanizates prepared therefrom. The authors describe the use of certain alkenylaminosilanes for use in the initiation of anionic polymerizations.

U.S. Pat. No. 8,299,167 B2 relates to a conjugated diene polymer obtained by polymerizing a conjugated diene monomer and a vinylaminosilane in the presence of an alkali metal catalyst.

WO 2011/028523 relates to a process for preparing a polydiene, the process comprising the polymerization of a conjugated diene monomer with a lanthanide-based catalyst system in the presence of a vinylsilane, an allylsilane, or an allylvinylsilane.

U.S. Pat. No. 3,485,857 relates to a class of compounds having both a silicon-nitrogen bond and a metal-carbon bond, useful as intermediates in the preparation of organosilicon compounds having silicon functionality, carbon functionality or both. It describes the reaction of methylamine and vinyldimethylchlorosilane to produce sym.-divinyltetramethyl-N-methyldisilazane, and the copolymerization of the reaction product and styrene in the presence of n-butyllithium.

The present invention aims at the provision of cured elastomeric polymer (rubber) compositions exhibiting an improved performance in terms of heat build-up (HBU), rebound 60, rolling resistance upon retention of wet and ice grip (at same microstructure, Tg as reflected by tan δ) in balance with good processing properties (CML-ML) and a relatively low Mooney viscosity. The polymer Mooney viscosity shows no increase at extended storage time. Overall, the invention aims at improving the balance of fuel saving and processing properties.

SUMMARY OF THE INVENTION

The present invention is inter alia based on the finding that the above objects can be solved by employing a novel polymerizable multivinylaminosilane as a branching agent, especially by employing such compound in the polymerization of one or more conjugated dienes such as 1,3-butadiene ("butadiene") and isoprene and optionally one or more aromatic vinyl compounds such as styrene.

Thus, in a first aspect, the present invention provides a multivinylaminosilane of the following Formula 1:

(A)-B$_n$          (Formula 1)

wherein
A is an organic group having at least two amino groups;
each B is independently selected from a group —Si(R$^1$)(R$^2$)(R$^3$), wherein R$^1$, R$^2$ and R$^3$ are each independently selected from vinyl, butadienyl, methyl, ethyl, propyl, butyl, hexyl, octyl, phenyl and benzyl, with the proviso that at least one of R$^1$, R$^2$ and R$^3$ is selected from vinyl and butadienyl, wherein each group B is a substituent of an amino group of group A;
at least two of the amino groups of group A are each substituted with at least one group B;
n is an integer of at least 2, preferably an integer selected from 2 to 6; and
all amino groups in group A are tertiary amino groups.

In an alternative to the first aspect, the present invention provides an initiator compound, suitable for use as an initiator in the polymerization of conjugated dienes, wherein said initiator compound is obtainable by reacting a multivinylaminosilane of Formula 1 with an organo-alkali metal compound.

In a second aspect, the present invention provides a process for preparing the multivinylaminosilane of Formula 1, said process comprising reacting an amine with a silane of the following Formula 2 in the presence of a base:

X—Si(R$^1$)(R$^2$)(R$^3$)          (Formula 2)

wherein
X is selected from Cl, Br, I, trifluoromethanesulfonate (OTf) and tosylate (OTos);
R$^1$, R$^2$ and R$^3$ are each independently selected from vinyl, butadienyl, methyl, ethyl, propyl, butyl, hexyl, octyl, benzyl and phenyl, with the proviso that at least one of R$^1$, R$^2$ and R$^3$ is selected from vinyl and butadienyl; and
the amine is a compound having at least two groups independently selected from a primary amino group and a secondary amino group.

In a third aspect, the present invention provides for the use of the multivinylaminosilane of Formula 1 as a branching agent for introducing branching in an elastomeric polymer.

In a fourth aspect, the present invention provides a process for preparing a branched elastomeric polymer, said process comprising (i) polymerizing at least one conjugated diene and a multivinylaminosilane of Formula 1 in the presence of an initiator compound, or (ii) polymerizing at least one conjugated diene in the presence of an initiator compound obtainable by reacting a multivinylaminosilane of Formula 1 and an organo-alkali metal compound.

In a fifth aspect, the present invention provides another process for preparing a branched elastomeric polymer, said process comprising reacting a living polymer, obtainable by anionically polymerizing at least one conjugated diene, with a multivinylaminosilane of Formula 1.

In a sixth aspect, the present invention provides the branched elastomeric polymer obtainable by the process according to the fourth or fifth aspect of the invention.

In a seventh aspect, the present invention provides a non-vulcanized (non-cured) polymer composition comprising the branched elastomeric polymer according to the sixth aspect of the invention and one or more further components selected from (i) components which are added to or formed as a result of the polymerization process used for making said polymer, (ii) components which remain after solvent removal from the polymerization process, and (iii) components which are added to the polymer after completion of the polymer manufacturing process, thus including components which are added to the "solvent-free" polymer by application of (but not limited to) a mechanical mixer.

In an eighth aspect, the present invention provides a vulcanized (cured) polymer composition which is obtained by vulcanizing (curing) the non-cured polymer composition according to the seventh aspect of the invention which comprises one or more vulcanizing (curing) agents.

In a ninth aspect, the present invention provides a process for preparing a vulcanized polymer composition, said process comprising vulcanizing the non-vulcanized polymer composition according to the seventh aspect of the invention which comprises one or more vulcanizing agents.

In a tenth aspect, the present invention provides an article comprising at least one component formed from the vulcanized polymer composition according to the eighth aspect of the invention.

The multivinylaminosilanes of Formula 1 have in common the ability of simultaneously reversibly branching and functionalizing two or more polymer chains, with "functionalizing" meaning that the thus functionalized polymer can react with other components in a polymer composition, in particular with filler. Depending on the crosslinking ability, i.e. degree of coupling functionality, one molecule of Formula 1 can introduce several and preferably up to six functionalities into a polymer chain, thus reducing the total amount of branching agent needed for a desired degree of functionalization, with associated cost benefits.

The elastomeric polymer according to the sixth aspect of the invention has been found to not exhibit a significant viscosity increase during extended storage, as shown in FIG. 1. The non-vulcanized polymer composition according to the seventh aspect of the invention, especially when containing silica as a filler, has been found to exhibit a comparatively low compound Mooney (CML1+4) viscosity. Moreover, the vulcanized polymer composition according to the eighth aspect of the invention has been found to exhibit reduced heat build-up and improved tan δ values, corresponding to reduced rolling resistance and improved ice grip.

Overall, the present invention accomplishes the aim of obtaining an improved balance of processing properties of a polymer composition and fuel saving properties of the polymer composition after vulcanization and forming in a tire.

DRAWING

FIG. 1 is a diagram showing the development of the Mooney viscosity MU of elastomeric polymer Y of the invention modified (branched) with the multivinylaminosilane of Example M12.

DETAILED DESCRIPTION

Multivinylaminosilane of Formula 1

The multivinylaminosilane of Formula 1 has at least two amino groups substituted with at least one ethylenically unsaturated silyl group B. The expression "group B is a substituent of an amino group" or "amino group substituted with a group B" is used herein to describe the bonding of the group B to the nitrogen atom of the amino group, i.e. $>N-Si(R^1)(R^2)(R^3)$. An amino group of group A may be substituted with 0, 1 or 2 groups B. All amino groups of group A are tertiary amino groups, i.e. amino groups carrying no hydrogen atom.

The organic group A is preferably a group having no active hydrogens. The expression "active hydrogen" is used in the context of the present invention to designate a hydrogen atom which is not inert, i.e. will react, in an anionic polymerization of conjugated dienes such as butadiene or isoprene.

The organic group A is also preferably a group having no electrophilic groups. The expression "electrophilic group" is used in the context of the present invention to designate a group which will react with n-butyllithium as a model initiator and/or with the living chain in an anionic polymerization of conjugated dienes such as butadiene or isoprene. Electrophilic groups include: alkynes, (carbo)cations, halogen atoms, Si—O, Si—S, Si-halogen groups, metal-C-groups, nitriles, (thio)carboxylates, (thio)carboxylic esters, (thio)anhydrides, (thio)ketones, (thio)aldehydes, (thio)cyanates, (thio)isocyanates, alcohols, thiols, (thio)sulfates, sulfonates, sulfamates, sulfones, sulfoxides, imines, thioketals, thioacetals, oximes, carbazones, carbodiimides, ureas, urethanes, diazonium salts, carbamates, amides, nitrones, nitro groups, nitrosamines, xanthogenates, phosphanes, phosphates, phosphines, phosphonates, boronic acids, boronic esters, etc.

More preferably, the organic group A is a group having neither active hydrogens nor electrophilic groups.

In preferred embodiments of the first aspect of the invention, the multivinylaminosilane of Formula 1 is selected from the following compounds of Formula 1-1 to 1-5, in which the same limitations and provisos of Formula 1 apply as regards the group B and the index n, i.e. the multivinylaminosilane has at least two groups B, while the limitations and provisos of Formula 1 for group A are inherently satisfied:

Embodiment 1

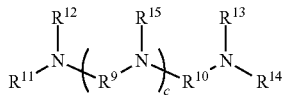
(Formula 1-1)

wherein
- each of $R^{11}$, $R^{12}$, $R^{13}$, $R^{14}$ and $R^{15}$ is independently selected from group B, $C_1$-$C_{18}$ alkyl, $C_6$-$C_{18}$ aryl, optionally $C_1$-$C_4$ alkyl-substituted $C_3$-$C_{12}$ heteroaryl, $C_7$-$C_{18}$ aralkyl, $(R^4)_a$—O—$(R^5)_b$, wherein each of $R^4$ and $R^5$ is independently selected from $C_1$-$C_6$ alkyl and $C_6$-$C_{18}$ aryl and a and b are each integers independently selected from 0 to 4, and —Si($R^6$)($R^7$)($R^8$), wherein each of $R^6$, $R^7$ and $R^8$ is independently selected from methyl, ethyl, propyl, butyl, hexyl, octyl, phenyl and benzyl;
- each of $R^9$ and $R^{10}$ is independently selected from divalent ethyl, propyl, butyl, phenyl and —$(CH_2)_{a'}$—$C_6H_5$—$(CH_2)_{b'}$—, wherein each of a' and b' is an integer independently selected from 0 and 1; and
- c is an integer selected from 0, 1, 2 and 3.

Preferably in Formula 1-1, each of $R^{11}$, $R^{12}$, $R^{13}$, $R^{14}$ and $R^{15}$ is independently selected from group B and methyl; each of $R^9$ and $R^{10}$ is divalent ethyl; and c is an integer selected from 0, 1, 2 and 3.

Specific embodiments of Formula 1-1 include:

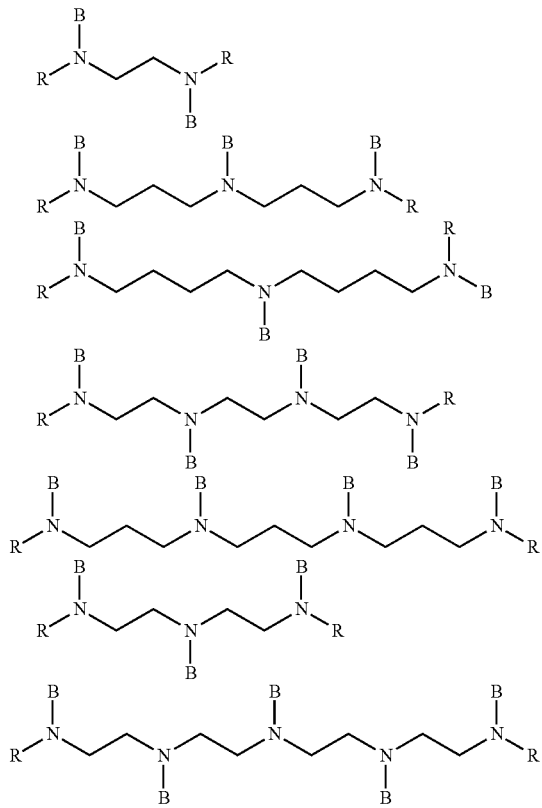

wherein each R is independently selected from B, $C_1$-$C_6$ alkyl and benzyl.

Embodiment 2

(Formula 1-2)

wherein the group —N< >N— is a 5- to 18-membered heterocyclic group which may be saturated or unsaturated and which may be substituted on any carbon atom of the ring with a $C_1$-$C_6$ alkyl group, wherein heteroatomic groups other than the two N atoms expressly shown in Formula 1-2 are selected from —N=, >$NR^{16}$, wherein $R^{16}$ is selected from group B, $C_1$-$C_6$ alkyl, phenyl and benzyl, —O—, —S— and >$SiR^{17}R^{18}$, wherein each of $R^{17}$ and $R^{18}$ is independently selected from $C_1$-$C_6$ alkyl, phenyl and benzyl. A preferred group —N< >N— is piperazinyl.

Specific embodiments of Formula 1-2 include:

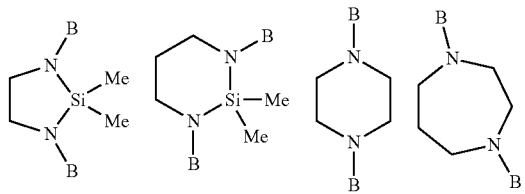

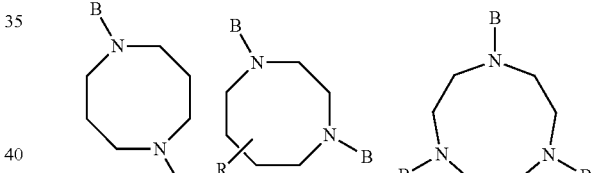

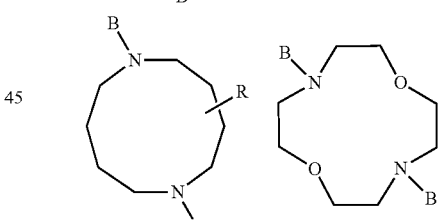

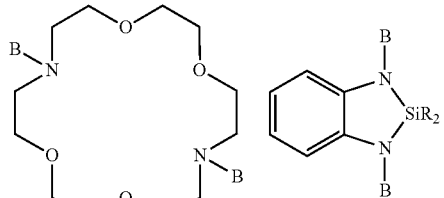

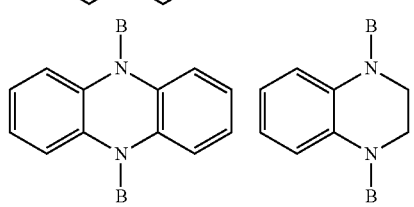

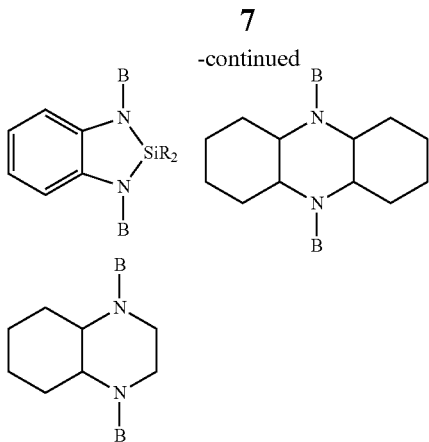

wherein R is a $C_1$-$C_6$ alkyl group.

Embodiment 3

(Formula 1-3)

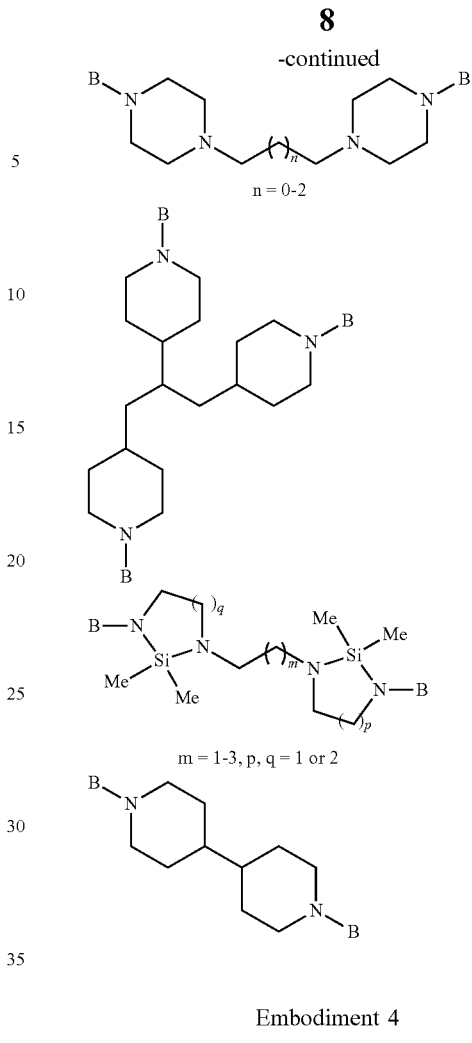

wherein each of $R^{20}$, $R^{21}$ and $R^{22}$ is independently selected from a single bond and a divalent $C_1$-$C_{10}$ alkyl group, d is an integer selected from 0, 1 and 2, d' is an integer selected from 0 and 1, wherein d is 0 when d' is 0, each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, and heteroatomic groups other than the two groups N and X expressly shown in Formula 1-3 are selected from —N=, >$NR^{16}$, wherein $R^{16}$ is selected from $C_1$-$C_6$ alkyl, group B, phenyl and benzyl, —O—, —S— and >$SiR^{17}R^{18}$, wherein each of $R^{17}$ and $R^{18}$ is independently selected from $C_1$-$C_6$ alkyl, phenyl and benzyl. Preferred groups —N< >X— include piperidinyl and piperazinyl.

Specific embodiments of Formula 1-3 include:

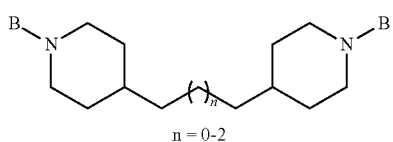

n = 0-2

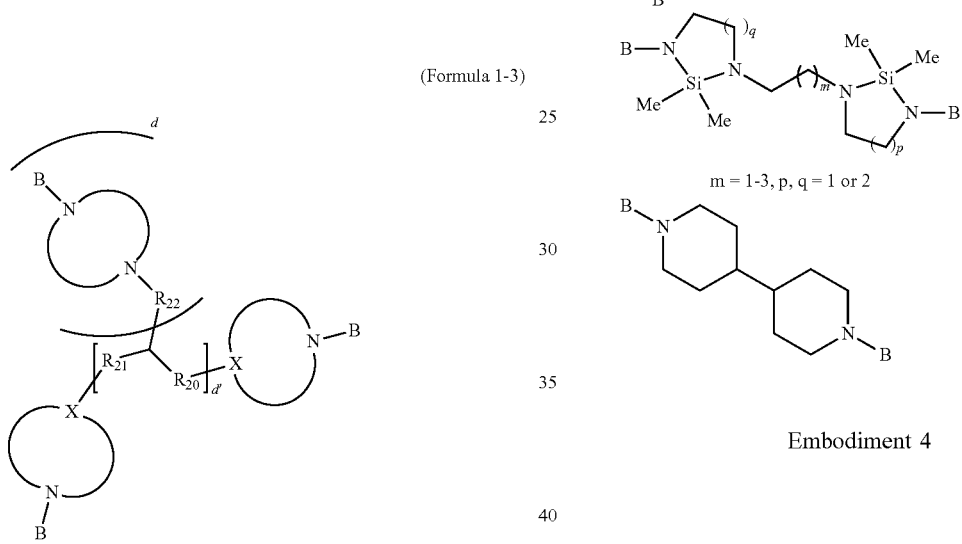

m = 1-3, p, q = 1 or 2

Embodiment 4

(Formula 1-4)

wherein D is a 5- to 10-membered carbocyclic or heterocyclic group which may be saturated or unsaturated and which may be substituted on any carbon atom of the ring with a $C_1$-$C_6$ alkyl group, wherein heteroatomic groups are selected from —N=, >$NR^{16}$, wherein $R^{16}$ is selected from $C_1$-$C_6$ alkyl, group B, phenyl and benzyl, —O—, —S— and >$SiR^{17}R^{18}$, wherein each of $R'^7$ and $R^{18}$ is independently selected from $C_1$-$C_6$ alkyl and phenyl, each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, $R^{23}$ is selected from a single bond and a divalent $C_1$-$C_{10}$ alkyl group, and e is an integer selected from 2, 3 and 4. Preferred groups D include cyclopentyl, cyclohexyl, phenyl and tetrahydrofuranyl. Preferred groups —N< >X— include piperidinyl and piperazinyl.

Preferably in Formula 1-4, D is selected from cyclopentyl, cyclohexyl, phenyl and tetrahydrofuranyl; each group —N<

>X— is selected from piperidinyl and piperazinyl; $R^{23}$ is a single bond; and e is an integer selected from 2 and 3.

Specific embodiments of Formula 1-4 include:

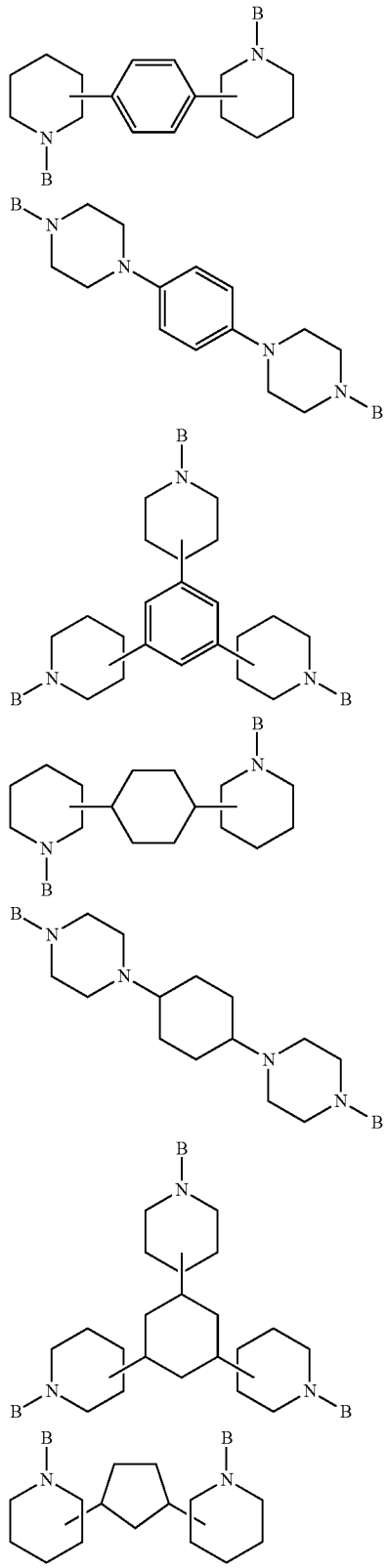

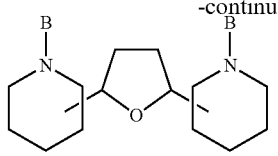

Embodiment 5

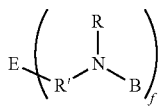   (Formula 1-5)

wherein E is a 6- to 10-membered cycloaliphatic or aromatic group, each R' is independently selected from a single bond and $C_1$-$C_2$ alkyl, each R is independently selected from B, $C_1$-$C_4$ alkyl and benzyl, and f is an integer selected from 2 and 3.

Preferably in Formula 1-5, E is selected from cyclohexyl and phenyl; R' is a single bond, R is selected from B, $C_1$-$C_4$ alkyl and benzyl; and f is an integer selected from 2 and 3.

Specific embodiments of Formula 1-5 include:

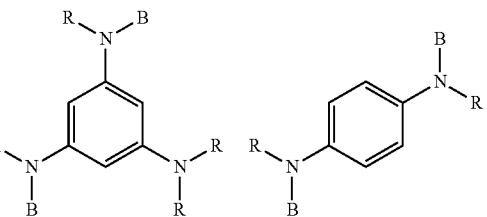

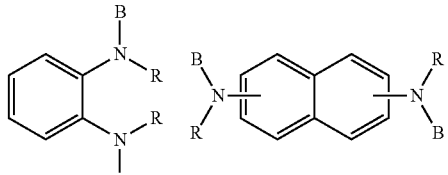

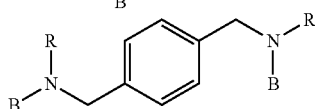

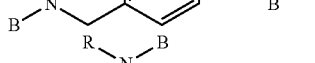

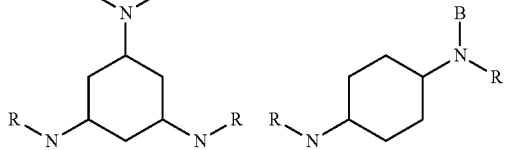

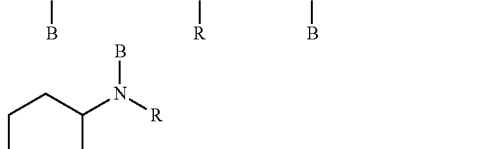

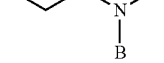

wherein each R is independently selected from B, $C_1$-$C_4$ alkyl and benzyl.

Initiator Compound Obtainable from the Compound of Formula 1

The initiator compound which constitutes part of the first aspect of the invention is obtainable by reacting a multivinylaminosilane of Formula 1 as defined above, including all embodiments thereof, with an organo-alkali metal compound.

Suitable, exemplary organo-alkali metal compounds include methyllithium, ethyllithium, n-butyllithium, s-butyllithium, t-octyllithium, isopropyllithium, phenyllithium, cyclohexyllithium, 2-butyllithium, 4-phenylbutyllithium, t-butyldimethylsilyloxypropyllithium, dialkylaminopropyllithium, N-morpholinopropyllithium, sodium biphenylide, sodium naphthalenide and potassium naphthalenide. More preferably, the initiator compound is a monolithium alkyl, alkylaryl or aryl compound.

The initiator compound obtainable from the multivinylaminosilane of Formula 1 can be prepared in an inert solvent and in the presence of randomizer compounds, and suitable solvents are the same as they are used in solution polymerization as defined below.

Preparation of Multivinylaminosilane of Formula 1

Generally, in accordance with the second aspect of the present invention, the multivinylaminosilanes of Formula 1 of the first aspect of the invention are prepared by reacting, in the presence of a base, an amine having at least two groups independently selected from a primary amino group and a secondary amino group with a silane of Formula 2 as defined herein.

Useful silanes of Formula 2 for preparing a multivinylaminosilane of Formula 1 include chlorodi($C_1$-$C_4$ alkyl)vinylsilanes, especially chlorodimethylvinylsilane, chlorodiethylvinyl-silane and chlorodiphenylvinylsilane, preferably chlorodimethylvinylsilane.

The amine having a least two primary or secondary amino groups structurally corresponds to the group A in Formula 1, yet having at least two primary or secondary amino groups instead of the corresponding tertiary amino groups.

Thus, in Embodiment 1, the amine used for preparing the compound of Formula 1-1 can be selected from phenylene diamine, $C_2$-$C_4$ monoalkylene diamines, $C_2$-$C_4$ dialkylene triamines and $C_2$-$C_4$ trialkylene tetraamines, preferably from monoethylene diamine, diethylene triamine, dipropylene triamine, triethylene tetraamine and tetraethylene pentamine.

In Embodiment 2, the amine used for preparing the compound of Formula 1-2 can be selected from piperazine and 1,7-dioxa-4,10-diazacyclododecane.

In Embodiment 3, the amine used for preparing the compound of Formula 1-3 can be selected from triethylene tetramine, 4,4'-trimethylenedipiperidine, 4,4'-ethylenedipiperidin and 1-(3-piperazin-1-ylpropyl)piperazine.

In Embodiment 4, one amine used for preparing the compound of Formula 1-4 can be 1,4-di(piperazin-1-yl)benzene (made from e.g. 1,4-dibromobenzene and piperazine). Saturated amines used for preparing compounds of Formula 1-4 can be made by transition metal catalyzed hydrogenation of the corresponding aromatic amines.

In Embodiment 5, the amine used for preparing the compound of Formula 1-5 can be selected from 1,2-cyclohexandiamine, o- or p-phenylenediamine, 1,3,5-triaminobenzene, 1,5-diaminonaphthalene and 1,8-diaminonaphthalene.

Generally, the amine and the silane of Formula 2 will be reacted in proportions so as to attach at least two groups B to the amine, for example by using a molar ratio of amine to silane of Formula 2 in the range of from 0.5 to 0.1 (depending on the number of amines). For each mol of primary and secondary amino groups, 1 to 3 moles of silane of Formula 2 are used.

The preparation of the multivinylaminosilane of Formula 1 can also involve the (partial) reaction between the amine and a silane other than a silane of Formula 2. In such case, the reaction between the amine, the silane of Formula 2 and the other silane can be carried out sequentially, for example reacting the amine firstly with the silane of Formula 2 and secondly with the other silane or vice versa.

The base is preferably selected from tertiary aliphatic or aromatic amines such as triethylamine, pyridine and 1,4-diazabicyclo[2.2.2]octane (DABCO) or substituted amidines or guanidines such as 1,8-diazabicycloundecene (DBU), 1,5-diazabicyclo[4.3.0]non-5-ene (DBN), 1,1,3,3-tetramethylguanidine, preferably triethylamine and pyridine. The base is generally used in a total amount of 0.5 to 5 mol per mol of primary and secondary amino groups, preferably 1 to 3 mol per mol of primary and secondary amino groups. It is also possible to use the amine having a least two primary or secondary amino groups as the base, yet it will then be necessary to increase its amount accordingly, usually by 1.5-5 equivalents. It is important to ensure an excess of base as compared the silane reactant, in terms of molar amounts, so that all HX generated in the reaction can be captured (quenched) by base.

The reaction can be carried out in a solvent, especially in an inert solvent, such as a hydrocarbon solvent, including pentane, n-hexane, cyclohexane, heptane, benzene and toluene, an ether solvent, including diethylether, tetrahydrofuran and tert-butylmethylether, a chlorinated solvent, including chloroform, tetrachloromethane and dichloromethane, an ester solvent such as ethyl acetate and methyl acetate, or other dipolar solvents such as acetone, dimethylformamide and acetonitrile. Preferred solvents are dichloromethane, chloroform, diethylether, ethyl acetate, toluene and cyclohexane. The total concentration of the reactants in the solvent is usually in the range of from 0.1 to 2 M.

The reaction between the amine and the silane of Formula 2 can be carried out under conditions as they will be apparent to a person skilled in the art, for example from reactions used for reacting an amine with a halosilane.

The reaction can suitably be carried out at a temperature of from −30° C. to the reflux temperature of the reaction mixture, preferably from 0° C.-25° C.

Usually, the reaction is carried out by dropwise adding the silane of Formula 2, in solution or neat, to a solution of the amine and the base. The reaction mixture is stirred and reacted for a sufficient time, generally for several hours and preferably for at least one hour, at a temperature of usually of 0° C. to the reflux temperature. After termination or completion of the reaction, any insoluble salts formed in the course of the reaction can be filtered off, the solvent can be removed by distillation under reduced pressure, and purification such as via vacuum distillation or recrystallization provides the multivinylaminosilane of Formula 1.

Use as a Branching Agent—Polymerization

In accordance with the third aspect of the present invention, the multivinylaminosilane of Formula 1 of the present invention is suitably used as a branching agent for introducing reversible branching in an elastomeric polymer. For this purpose, the multivinylaminosilane—as such or after reaction with an organo-alkali metal compound to generate an initiator compound—can be used already in the polymerization reaction which is carried out for preparing the elastomeric polymer (fourth aspect of the invention), or it can be added to and reacted with a living elastomeric polymer (fifth aspect of the invention). The process of the fourth aspect of the invention specifically comprises (i) polymerizing at least one conjugated diene and a multivinylaminosilane of Formula 1 and optionally one or more aromatic vinyl monomers in the presence of an initiator compound, or (ii) polymerizing at least one conjugated diene and optionally one or more aromatic vinyl monomers in the presence of an initiator compound obtainable by reacting a multivinylaminosilane of Formula 1 and an organo-alkali metal compound.

The elastomeric polymer can be prepared generally via anionic, radical or transition metal-catalyzed polymerization, but is preferably prepared by anionic polymerization. Two or more vinylaminosilane compounds of Formula 1 may be used in combination. The polymerization may be conducted in a solvent and may be carried out with one or more of chain end-modifying agents, coupling agents (including modified coupling agents), randomizer compounds and polymerization accelerator compounds.

Further to the following specific disclosure, generally applicable directions on polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer); the amounts of each compound; monomer(s); and suitable process conditions are described in WO 2009/148932, fully incorporated herein by reference.

Conjugated Dienes (Conjugated Diene Monomers)

Exemplary conjugated diene monomers useful in the present invention include 1,3-butadiene, 2-($C_1$-$C_5$ alkyl)-1,3-butadiene such as isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and 1,3-cyclooctadiene. A mixture of two or more conjugated dienes may be used. Preferred conjugated dienes include 1,3-butadiene and isoprene. In one embodiment, the conjugated diene is 1,3-butadiene.

Aromatic Vinyl Monomers

The optional aromatic vinyl monomers include monovinylaromatic compounds, i.e. compounds having only one vinyl group attached to an aromatic group, and di- or higher vinylaromatic compounds which have two or more vinyl groups attached to an aromatic group. Exemplary aromatic vinyl monomers optionally used together with the at least one conjugated diene include styrene, $C_{1-4}$ alkyl-substituted styrene such as 2-methylstyrene, 3-methylstyrene, 4-methylstyrene, 2,4-dimethylstyrene, 2,4,6-trimethylstyrene, α-methylstyrene, 2,4-diisopropyl-styrene and 4-tert-butylstyrene, stilbene, vinyl benzyl dimethylamine, (4-vinylbenzyl)dimethyl aminoethyl ether, N,N-dimethylaminoethyl styrene, tert-butoxystyrene, vinylpyridine and divinylaromatic compounds such as 1,2-divinylbenzene, 1,3-divinylbenzene and 1,4-divinylbenzene. Two or more aromatic vinyl monomers may be used in combination. A preferred aromatic vinyl monomer is a monovinylaromatic compound, more preferably styrene.

The monovinylaromatic compound(s), especially including styrene, may be used, depending on the application, in total amounts of up to 70 wt. %, in particular 40-70 wt. %, or 15-40 wt. %, or 1-15 wt. %, based on the total weight of monomers used in the polymerization reaction. The di- or higher vinylaromatic compounds such as divinylbenzene, including 1,2-divinylbenzene, 1,3-divinylbenzene and 1,4-divinylbenzene, may be used in total amount of 1 wt. % or less (based on the total molar weight of the monomers used to make the polymer). In one preferred embodiment, 1,2-divinylbenzene is used in combination with styrene and butadiene or isoprene.

Other Monomers

Comonomers other than the multivinylaminosilane of Formula 1, the conjugated diene monomer and the optional aromatic vinyl monomer, which may be used in preparing the elastomeric polymer of the invention, include acrylic monomers such as acrylonitrile, acrylates, e.g., acrylic acid, methyl acrylate, ethyl acrylate, propyl acrylate and butyl acrylate, and methacrylates, e.g., methyl methacrylate, ethyl methacrylate, propyl methacrylate and butyl methacrylate. Such other comonomers are usually used at a proportion of not more than 5 wt. %, based on the total weight of monomers used in the polymerization reaction. Additionally, vinylaminodisiloxane or butadienylaminodisiloxane monomers such as 4-[3-(tert-butyl)-1,3,3-trimethyl-1-vinyldisiloxanyl]morpholine, 3-(tert-butyl)-N,N-di ethyl-1,3,3-trimethyl-1-vinyl-disiloxan-1-amine and 3-(tert-butyl)-N,N-dibutyl-1,3,3-trimethyl-1-vinyldisiloxan-1-amine may be used.

Initiator Compounds

An initiator compound is used in the polymerization process of the present invention, and two or more initiator compounds may be used in combination. The initiator compound may be a monovalent or multivalent (divalent, trivalent, etc.) initiator compound. Suitable initiator compounds include alkali metals, organo-alkali metal compounds, a complex between an alkali metal and a polar compound, an oligomer containing an alkali metal, and Lewis acid-base complexes. Exemplary alkali metals include lithium, sodium, potassium, rubidium and cesium. Exemplary organo-alkali metal compounds include ethyllithium, n-butyllithium, s-butyllithium, t-octyllithium, isopropyllithium, phenyllithium, cyclohexyllithium, 2-butyllithium, 4-phenylbutyllithium, t-butyldimethylsilyloxypropyllithium, dialkylaminopropyllithium, N-morpholinopropyllithium, lithiumdiisopropylamide, lithium piperidide, lithium pyrrolidide, dilithiated diphenylethylene compounds, dilithiated bis(1-arylethenyl) benzenes, multi-lithiated trivinyl benzene compounds, sodium biphenylide, sodium naphthalenide and potassium naphthalenide. Exemplary complexes between an alkali metal and a polar compound include a lithium-tetramethylethylenediamine complex, a lithium-tetrahydrofuran complex, a lithium-ditetrahydrofuranepropane complex, and the sodium and potassium analogues thereof. More preferably, the initiator compound is a mono- or dilithium alkyl, alkylaryl or aryl compound. Further useful initiators include the amino silane polymerization initiators described in WO2014/040640 and the polymerization initiators described in PCT/EP2013/065399.

In a particular embodiment, the initiator compound is one obtainable by reacting a multivinylaminosilane of Formula 1 and an organo-alkali metal compound as defined above. In this embodiment, the initiator compound is capable of performing the functions of both initiator compound and branching agent.

The total amount of the initiator(s), in particular the organolithium initiator(s), will be adjusted depending on the monomer and target molecular weight or the polymer. The total amount is typically from 0.05 to 5 mmol, preferably from 0.2 to 3 mmol per 100 grams of monomer. Low molecular weight polymers may be prepared by using 5 to 20 mmol of initiator per 100 g of monomer.

Solvent

The polymerization is usually conducted as a solution polymerization, wherein the formed polymer is substantially soluble in the reaction mixture, or as a suspension/slurry polymerization, wherein the formed polymer is substantially insoluble in the reaction medium. More preferably, the polymer is obtained in a solution polymerization. As the polymerization solvent, a hydrocarbon solvent is conventionally used which does not deactivate the initiator, catalyst or active polymer chain. The polymerization solvent may be a combination of two or more solvents. Exemplary hydrocarbon solvents include aliphatic and aromatic solvents. Specific examples include (including all conceivable constitutional isomers): propane, butane, pentane, hexane, heptane, butene, propene, pentene, hexane, octane, benzene, toluene, ethylbenzene and xylene.

Chain End-Modifying Agents

One or more chain end-modifying agents may be used in the polymerization reaction of the present invention for further controlling polymer properties by reacting with the terminal ends of the polymer chains in the polymer of the invention. Generally, silane-sulfide omega chain end-modifying agents such as disclosed in WO 2007/047943, WO 2009/148932, U.S. Pat. No. 6,229,036 and US 2013/0131263, each incorporated herein by reference in its entirety, can be used for this purpose. Other chain end-modifying agents suitable for use in the present invention are those disclosed in WO2014/040640 and PCT/EP2013/065399 and the silane sulfide modifiers described in WO2014/040639.

The chain end-modifying agents may be added intermittently (at regular or irregular intervals) or continuously during the polymerization, but are preferably added at a conversion rate of the polymerization of more than 80 percent and more preferably at a conversion rate of more than 90 percent. Preferably, a substantial amount of the polymer chain ends is not terminated prior to the reaction with the chain end-modifying agent; that is, living polymer chain ends are present and are capable of reacting with the modifying agent.

Coupling Agents

For further controlling polymer molecular weight and polymer properties, a coupling agent ("linking agent") can be used as an optional component in the process of the invention. A coupling agent will reduce hysteresis loss by reducing the number of free chain ends of the elastomeric polymer and/or reduce the polymer solution viscosity, compared with non-coupled essentially linear polymer macromolecules of identical molecular weight. Coupling agents such as tin tetrachloride may functionalize the polymer chain end and react with components of an elastomeric composition, for example with a filler or with unsaturated portions of a polymer. Exemplary coupling agents are described in U.S. Pat. Nos. 3,281,383, 3,244,664 and 3,692,874 (e.g., tetrachlorosilane); U.S. Pat. Nos. 3,978,103, 4,048,206, 4,474,908 and 6,777,569 (blocked mercaptosilanes); U.S. Pat. No. 3,078,254 (multi-halogen-substituted hydrocarbon, such as 1,3,5-tri(bromo methyl) benzene); U.S. Pat. No. 4,616,069 (tin compound and organic amino or amine compound); and U.S. 2005/0124740.

Generally, the chain end-modifying agent is added before, during or after the addition of the coupling agent, and the modification reaction is preferably carried out after the addition of the coupling agent.

The total amount of coupling agents used will influence the Mooney viscosity of the coupled polymer and is typically in the range of from 0.001 to 4.5 milliequivalents per 100 grams of the elastomeric polymer, for example 0.01 to about 1.5 milliequivalents per 100 grams of polymer.

Randomizer Compounds

Randomizer compounds as conventionally known in the art (also known as polar coordinator compounds) may optionally be added to the monomer mixture or polymerization reaction, in order to adjust the microstructure (i.e. the content of vinyl bonds) of the conjugated diene part of the polymer, or to adjust the composition distribution of any aromatic vinyl monomer and of the vinyl bonds in the polymer chain. A combination of two or more randomizer compounds may be used. Randomizer compounds useful in the invention are generally exemplified by Lewis base compounds. Suitable Lewis bases for use in the present invention are, for example, ether compounds such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, ($C_1$-$C_8$ alkyl)tetrahydrofurylethers (including methyltetrahydrofurylether, ethyltetrahydrofurylether, propyltetrahydrofurylether, butyltetrahydrofurylether, hexyltetrahydrofurylether and octyltetrahydrofurylether), tetrahydrofuran, 2,2-(bistetrahydrofurfuryl)propane, bistetra-hydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amines such as triethylamine, pyridine, N,N,N',N'-tetramethyl ethylenediamine, dipiperidinoethane, methyl ether of N,N-diethylethanolamine, ethyl ether of N,N-diethylethanolamine, N,N-diethylethanolamine and dimethyl N,N-tetrahydrofurfuryl amine. Examples of preferred randomizer compounds are identified in WO 2009/148932, incorporated herein by reference in its entirety.

The randomizer compound will typically be added at a molar ratio of randomizer compound to initiator compound of from 0.012:1 to 10:1, preferably from 0.1:1 to 8:1 and more preferably from 0.25:1 to about 6:1.

Accelerator Compounds

The polymerization can optionally include accelerators to increase the reactivity of the initiator (and, thus, to increase the polymerization rate), to randomly arrange aromatic vinyl monomers introduced into the polymer, or to provide a single chain of aromatic vinyl monomers, thus influencing the distribution of aromatic vinyl monomers in a living anionic elastomeric copolymer. Examples of accelerators include sodium alkoxides or sodium phenoxides and potassium alkoxides or potassium phenoxides, preferably potassium alkoxides or potassium phenoxides, such as potassium isopropoxide, potassium t-butoxide, potassium t-amyloxide, potassium n-heptyloxide, potassium benzyloxide, potassium phenoxide; potassium salts of carboxylic acids, such as isovaleric acid, caprylic acid, lauric acid, palmitic acid, stearic acid, oleic acid, linolenic acid, benzoic acid, phthalic acid and 2-ethyl hexanoic acid; potassium salts of organic sulfonic acids, such as dodecyl benzenesulfonic acid, tetradecyl benzenesulfonic acid, hexadecyl benzenesulfonic acid and octadecyl benzenesulfonic acid; and potassium salts of organic phosphorous acids, such as diethyl phosphite, diisopropyl phosphite, diphenyl phosphite, dibutyl phosphite, and dilauryl phosphite.

Such accelerator compounds may be added in a total amount of from 0.005 to 0.5 mol per 1.0 gram atom equivalent of lithium initiator. If less than 0.005 mol is added, a sufficient effect is not typically achieved. On the other hand, if the amount of the accelerator compound is more than about 0.5 mol, the productivity and efficiency of the chain end modification reaction can be significantly reduced.

Dosing of Multivinylaminosilane

The multivinylaminosilane of Formula 1 can be used in a total amount of from 0.01 to 10 mol per mol of initiator compound(s). Preferably, it is used in a total amount of from 0.1 to 5 mol, or 0.1 to 3 mol, or 0.1 to 1.5 mol. Different multivinylaminosilanes of Formula 1 may be used in combination in accordance with the present invention. When the polymer of the invention is used in tire applications, for example in rubber compound for a tire tread or tire sidewall, it is preferable to use the multivinylaminosilane of Formula 1 in a total amount of from 0.1 to 5 mol per mol of initiator compound(s), more preferably 0.1 to 2 mol.

The mode of addition ("dosing") of the multivinylaminosilane of Formula 1 in the polymerization process relative to the conjugated diene monomer and optional aromatic vinyl monomer, initiator compound and other components will affect the structure of the resulting polymer. Thus, statistical copolymers and block copolymers having blocks of multivinylaminosilane polymer and blocks of other monomers in desired proportions and sequences can be prepared. Exemplary dosing schemes are as follows:

(1) Continuous (incremental) addition of the multivinylaminosilane of Formula 1 to a mixture comprising conjugated diene monomer, optionally aromatic vinyl monomer, and initiator compound, as the polymerization proceeds, results in the provision of a statistical copolymer.

(2) Dosing of multivinylaminosilane of Formula 1 before addition of main amount of initiator together with main amounts of comonomers. After quantitative or close to quantitative conversion of monomers, a second addition of multivinylaminosilane can be performed to generate block structure at polymer end.

(3) Dosing of multivinylaminosilane of Formula 1 before addition of main amount of initiator together with main amounts of comonomers, which can be added after quantitative or close to quantitative conversion of multivinylaminosilane. Additionally, several dosing steps of multivinylaminosilane of Formula 1 in variable proportions can be made at defined degrees of conversion of total monomer to generate n tapered or block structure elements within the polymer chain. After quantitative or close to quantitative conversion of monomers, a final addition of multivinylaminosilane or a chain-end modifying agent or coupling agent can be used to generate block structure or another functionalization or coupling at polymer end.

(4) Several dosing steps of multivinylaminosilane of Formula 1 in variable proportions can be made at defined degrees of conversion of total monomer to generate tapered or block structure elements within the polymer chain. After quantitative or close to quantitative conversion of monomers, a final addition of multivinylaminosilane or a chain-end modifying agent or coupling agent can be used to generate block structure or another functionalization or coupling at polymer end.

(5) Dosing of multivinylaminosilane of Formula 1 before addition of main amount of initiator together with main amounts of comonomers (tapered structure), which can be added after quantitative or close to quantitative conversion of multivinylaminosilane to generate block structure. After quantitative or close to quantitative conversion of monomers, chain-end modifying agent or coupling agent can be added to functionalize or couple polymer chains, which is a preferred dosing option.

Polymer

The elastomeric polymer according to the sixth aspect of the invention is obtainable by the process of the present invention, namely by polymerizing at least one conjugated diene and a multivinylaminosilane of Formula 1 in the presence of an initiator compound, polymerizing at least one conjugated diene in the presence of an initiator compound obtainable by reacting a multivinylaminosilane of Formula 1 and an organo-alkali metal compound, or reacting a living polymer, obtainable by anionically polymerizing at least one conjugated diene, with a multivinylaminosilane of Formula 1. The polymer of the invention may be a statistical, block or tapered copolymer, or an alpha- or alpha,omega-modified polymer where the multivinylaminosilane of Formula 1 is incorporated in the polymer chain by means of its vinyl functions. The polymer obtained is generally a branched elastomeric polymer.

In preferred embodiments, the polymer of the invention is an SSBR (solution styrene butadiene rubber) with a preferred vinyl content of 15-80%, more preferred 30-75%, most preferred 40-70% (dependent on the specific application), a styrene content (depending on the specific application) in total amounts of 40-70 wt. %, or 15-40 wt. %, or 1-15 wt. %; a PBR (polybutadiene rubber) with a vinyl content of <15%; or 15-40%, or 40-80%; a PIR (polyisoprene rubber); an SSIR (solution styrene isoprene rubber); or an SSIBR (solution styrene isoprene butadiene rubber); more preferably an SSBR or PBR; even more preferably an SSBR, each being modified by incorporation of the multivinylaminosilane of Formula 1. In case of an SSBR, the elastomeric polymer is characterized by a glass transition temperature (Tg, determined by DSC) of −90 to 0° C., preferably −80 to −5° C., more preferably −70 to −10° C. The most preferred Tg for truck tire applications is −70 to −40° C., and the most preferred Tg for passenger car tire applications is −40 to −10° C.

Non-Cured Polymer Composition

The non-cured polymer composition of the seventh aspect of the present invention comprises the elastomeric polymer of the sixth aspect of invention and one or more further components selected from (i) components which are added to or formed as a result of the polymerization process used for making said polymer, (ii) components which remain after solvent removal from the polymerization process, and (iii) components which are added to the polymer after completion of the polymer manufacturing process. In particular, such components (i) to (iii) can be one or more components selected from oils (extender oils), fillers, stabilizers and further polymers (which are not the polymers of the invention). In one embodiment, the polymer composition additionally comprises one or more vulcanizing agents.

In one embodiment, the non-cured (non-crosslinked or unvulcanized) polymer composition is obtained by conventional work-up of the reaction mixture obtained in the polymerization process. Work-up means the removal of the solvent using steam stripping or vacuum evaporation techniques.

In another embodiment, the non-cured polymer composition of the invention is obtained as a result of a further mechanical mixing process involving the worked-up reaction mixture (including the polymer of the invention), preferably in the form of a rubber bale (i.e. the product of a conventional compounding process in an internal mixer and/or by means of a two-roll mill), and at least one filler. Further details are described in F. Röthemeyer, F. Sommer, Kautschuk Technologie: Werkstoffe-Verarbeitung-Produkte, 3rd ed., (Hanser Verlag, 2013) and references cited therein.

The following components are usually added in non-cured compositions used in tires: Extender oils, stabilizers, fillers, further polymers.

(Extender) Oils

In one embodiment, the polymer composition of the present invention comprises the elastomeric polymer of the invention in combination with one or more oils, especially mineral oils. For representative examples and classification of oils see WO 2009/148932 and US 2005/0159513, each of which is incorporated herein by reference in its entirety. Such oils include, for instance, conventionally known extender oils such as aromatic, naphthenic and paraffinic extender oils, for example MES (mild extraction solvate), TDAE (treated distillate aromatic extract), rubber-to-liquid (RTL) oils, biomass-to-liquid (BTL) oils, factices, extender resins or liquid polymers (such as liquid BR) having a median molecular weight (determined via GPC according to BS ISO 11344:2004) of from 500 to 20000 g/mol. When using a mineral oil as the extender oil, it is preferably one or more selected from DAE (Destillated Aromatic Extracts), RAE (Residual Aromatic Extract), TDAE, MES and naphthenic oils. The aforementioned oils comprise different concentrations of polycyclic aromatic compounds, parafinics, naphthenics and aromatics, and have different glass transition temperatures. The above mentioned types of oil have been characterized in "Kautschuk. Gummi Kunststoffe", vol. 52, pages 799-805. In some embodiments, MES, RAE and TDAE are preferred extender oils for rubber.

The one or more oils can be added to the polymer prior to or after the termination of the polymerization process. When the extender oil is added to the polymer solution, the timing of addition should preferably be after modification of the polymer or termination of the polymerization, for example after the addition of the modifying agent or polymerization termination agent. After the addition of extender oil, the oil-extended polymer composition can be obtained by separating any polymerization solvent from the polymer by means of a direct drying method or steam stripping, drying the rubber using a vacuum dryer, hot-air dryer, roller and the like.

The polymer composition may have contain one or more oils in a total amount of from 0 to 70 phr, preferably 0.1 to 60 phr, more preferably 0.1 to 50 phr. When liquid polymers are used as extender oils in the polymer composition of the present invention, they are not taken into account when calculating the composition of the polymer matrix.

In another embodiment, the oil is added to the "solvent-free" polymer in a mechanical mixer together with at least one filler, preferably with at least one filler and at least one further polymer.

Fillers

The polymer composition of the invention, which optionally comprises one or more extender oils as defined above, may further comprise one or more fillers. Filler can be added to the polymer prior to or after the termination of the polymerization process. Examples of suitable fillers include carbon black (including electroconductive carbon black), carbon nanotubes (CNT) (including discrete CNT, hollow carbon fibers (HCF) and modified CNT carrying one or more functional groups, such as hydroxyl, carboxyl and carbonyl groups), graphite, graphene (including discrete graphene platelets), silica, carbon-silica dual-phase filler, clays (layered silicates, including exfoliated nanoclay and organoclay), calcium carbonate, magnesium carbonate, magnesium oxide, titanium dioxide, rubber gels, lignin, amorphous fillers, such as glass particle-based fillers, starch-based fillers, and combinations thereof. Further examples of suitable fillers are described in WO 2009/148932, which is fully incorporated herein by reference.

Any type of carbon black conventionally known to a person of skill in the art may be used. In one embodiment, the carbon black has an iodine number according to ASTM D 1510 of 20 to 250 mg/g, preferably 30 to 180 mg/g, more preferably 40 to 180 mg/g, and even more preferably 40 to 130 mg/g, and a DBP number according to ASTM D 2414 of 80 to 200 ml/100 g, preferably 100 to 200 ml/100 g, more preferably 115 to 200 ml/100 g (the DBP number determines the specific absorption volume of carbon black or of any bright filler by means of dibutyl phthalate).

Any type of silica conventionally known to a person of skill in the art and suitable as filler for tire rubber blends may be used. It is particularly preferred to use highly dispersed, precipitated silica having an nitrogen surface area (BET surface area; according to DIN ISO 9277 and DIN 66132) of 35 to 350 $m^2/g$, preferably 35 to 260 $m^2/g$, more preferably 100 to 260 $m^2/g$ and even more preferably 130 to 235 $m^2/g$, and having a CTAB surface area (according to ASTM D 3765) of 30 to 400 $m^2/g$, preferably 30 to 250 $m^2/g$, more preferably 100 to 250 $m^2/g$ and even more preferably 125 to 230 $m^2/g$. Such silica results, e.g. in rubber blends for tire treads, to particularly beneficial physical properties of the vulcanizates. In addition, it may bring about advantages in the processing of the blend, namely by reducing the time required for blending, while maintaining product properties, thus improving productivity. Useful silicas include those of the type Ultrasil® VN3 (trademark of Evonik Industries) as well as highly dispersed types, so-called HD silicas (e.g. Zeosil® 1165 MP of Rhodia).

Stabilizers

One or more stabilizers ("antioxidants") can optionally be added to the polymer prior to or after the termination of the polymerization process to prevent the degradation of the elastomeric polymer by molecular oxygen. Antioxidants based on sterically hindered phenols, such as 2,6-di-tert-butyl-4-methylphenol, 6,6'-methylenebis(2-tert-butyl-4-methylphenol), Iso-octyl-3-(3,5-di-tert-butyl-4-hydroxy-phenyl) propionate, hexamethylenebis[3-(3,5-di-tert-butyl-4-hydroxy-phenyl)propionate], octadecyl-3-(3,5-di-tert-butyl-4-hydroxyphenyl) propionate, isotridecyl-3-(3,5-di-tert-butyl-4-hydroxyphenyl) propionate, 1,3,5-trimethyl-2,4,6-tris(3,5-di-tert-butyl-4-hydroxybenzyl) benzene, 2,2'-ethylidenebis-(4,6-di-tert-butylphenol), tetrakis[methylene-3-(3,5-di-tert-butyl-4-hydroxyphenyl)propionate]methane, 2-[1-(2-hydroxy-3, 5-di-tert-pentyl-phenyl)ethyl]-4, 6-di-tert-pentylphenyl acrylate and 2-tert-butyl-6-(3-tert-butyl-2-hydroxy-5-methylbenzyl)-4-methylphenyl acrylate, and antioxidants based on thio-esters, such as 4,6-bis(octylthio-methyl)-o-cresol and pentaerythrityl tetrakis(3-laurylthio-propionate), are typically used. Further examples of suitable stabilizers can be found in F. Röthemeyer, F. Sommer, Kautschuk Technologie, $2^{nd}$ ed., (Hanser Verlag, 2006) pages 340-344, and references cited therein.

Further Polymers

Apart from polymer of the invention, extender oil(s), filler(s), etc., the polymer composition of the invention may additionally contain further polymer, especially further elastomeric polymer. Further polymers may be added as solution to a solution of the inventive polymer prior to work up of the polymer blend or may be added during a mechanical mixing process, e.g. in a Brabender mixer.

Further (elastomeric) polymers as referred to herein are elastomeric polymers which are not in accordance with the polymer of the invention, i.e. which do not contain repeating units derived from the multivinylaminosilane of Formula 1.

Vulcanizing Agents and Vulcanizing Accelerators

The polymer composition of the invention may optionally further comprise a least one vulcanizing agent. Any vulcanizing agent conventionally used in the manufacture of rubber products can be used in the invention, and a combination of two or more vulcanizing agents may be used.

Sulfur, sulfur-containing compounds acting as sulfur donors such as dithiols, sulfur accelerator systems and peroxides are the most common vulcanizing agents. Examples of sulfur-containing compounds acting as sulfur donors include dithiodimorpholine (DTDM), tetramethylthiuram disulfide (TMTD), tetraethyl thiuram disulfide (TETD) and dipentamethylene thiuram tetrasulfide (DPTT). Examples of sulfur accelerators include amine derivates, guanidine derivates, aldehydeamine condensation products, thiazoles, xanthogenates, thiuram sulfides, dithiocarbamates and thiophosphates. It is preferably to use one or more sulfonamide accelerators selected from N-cyclohexyl 2-benzothiazol sulfenamide (CBS), N,N-dicyclohexyl benzothiazole 2-sulfenamide (DCBS), benzothiazyl 2-sulfenemorpholide (MBS) and N-tert-butyl 2-benzothiazyl sulfenamide (TBBS). Further crosslinking systems such as available under the trade names Vulkuren® (1,6-bis(N,N-dibenzyl thiocarbamoyldithio)-hexane; Lanxess), Duralink® or Perkalink® (1,3-bis(citraconimidomethyl)benzene; Lanxess) or disclosed in WO 2010/049261 may be added to the polymer composition. Examples of peroxides include di-tert.-butyl-peroxides, di-(tert.-butyl-peroxy-trimethyl-cyclohexane), di-(tert.-butyl-peroxy-isopropyl-)benzene, dichloro-benzoylperoxide, dicumylperoxides, tert.-butyl-cumyl-peroxide, dimethyl-di(tert.-butyl-peroxy)hexane, dimethyl-di(tert.-butyl-peroxy)hexine and butyl-di(tert.-butyl-peroxy)valerate (*Rubber Handbook, SGF, The Swedish Institution of Rubber Technology* 2000).

A vulcanizing accelerator of the sulfene amide-type, guanidine-type or thiuram-type can be used together with a vulcanizing agent as required.

In addition, the polymer composition of the invention may contain conventional additives and vulcanization auxiliaries in proportions conventionally used. Such additives include:
a) aging inhibitors such as N-phenyl N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl N'-phenyl-p-phenylenediamine (IPPD), 2,2,4-trimethyl 1,2-dihydrochinolin (TMQ),
b) activators such as zinc oxide and fatty acids (e.g. stearic acid),
c) waxes,
d) resins, especially adhesive resins,
e) mastication additives such as 2,2'-dibenzamidodiphenyldisulfide (DBD) and
f) processing additives such as zinc soaps and fatty acid esters and their derivatives. Zinc oxide (zinc white) is preferably used as a component of the sulfur accelerator system.

A vulcanizing agent is typically added to the polymer composition in an amount of from 0.5 to 10 parts by weight or, in some embodiments, 1 to 6 parts by weight per 100 parts by weight of the total polymer. Examples of vulcanizing accelerators and amounts thereof added with respect to the total polymer are given in WO 2009/148932, which is incorporated herein by reference in its entirety.

Vulcanized Polymer Composition and Process for its Preparation

The vulcanized polymer composition of the eighth aspect of the invention is obtained by vulcanizing a polymer composition of the seventh aspect of the invention comprising one or more vulcanizing agents, under conditions and with machinery conventionally known in the art. The vulcanization process constitutes the ninth aspect of the present invention.

Article Comprising Vulcanized Polymer Composition

Since the vulcanized polymer compositions of the invention exhibit low rolling resistance, low dynamic heat build-up and increased wet grip, they are well suited for use in manufacturing, e.g., tires or parts of tires including for example: tire treads, side walls and tire carcasses as well as other industrial products such as belts, hoses, vibration dampers and footwear components. Thus, the article of the tenth aspect of the present invention comprises at least one component formed from the vulcanized polymer composition of the invention. The article may be, for instance, a tire, a tire tread, a tire side wall, a tire carcass, a belt, a gasket, a seal, a hose, a vibration damper, a golf ball or a footwear component, such as a shoe sole.

DEFINITIONS

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, etc., branched alkyl groups, such as isopropyl, tert-butyl, etc., and cyclic alkyl groups, such as cyclohexyl.

Aryl groups as defined herein include phenyl, biphenyl and other benzenoid compounds. Aryl groups preferably contain only one aromatic ring and most preferably contain a $C_6$ aromatic ring.

Alkylaryl groups as defined herein refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

The present invention will be explained in more detail by way of examples, which are not intended to be limiting the present invention.

EXAMPLES

Preparation and Characterization of Branching Agents (BA) and Selected Modifiers Compounds of the present invention are marked by an asterisk (*).

N-[Dimethyl(vinyl)silyl]-N-(4-methoxyphenyl)-1,1-dimethyl-1-vinylsilanamine

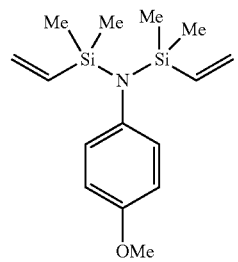 [SMILES: C=C[Si](C)(C)N(c1ccc(OC)cc1)[Si](C)(C)C=C]

p-Methoxyaniline (4.22 g, 34.3 mmol, 1.0 equiv.) was added to a solution of TEA (8.68 g, 85.8 mmol, 2.5 equiv.)

and chlorodimethylvinylsilane (10.3 g, 85.8 mmol, 2.5 equiv.) in DCM (60 ml) at 25° C. The reaction mixture was stirred at 25° C. for 16 d. Filtration and removal of the solvent furnished a residue which was purified by vacuum distillation. The title compound (7.80 g, 26.8 mmol, 78%) was received as colorless oil.

$C_{15}H_{25}NOSi_2$, $M_w$=291.54 g mol$^{-1}$
bp=130-132° C. (6 mbar).
$^1$H NMR (400 MHz, 20° C., $C_6D_6$): δ=6.87-6.85 (m, 2H), 6.70-6.67 (m, 2H), 6.29 (dd, J=20.3 Hz, J=14.7 Hz, 2H), 5.91 (dd, J=14.7 Hz, J=3.7 Hz, 2H), 5.72 (dd, J=20.4 Hz, J=3.8 Hz, 2H), 3.29 (s, 3H), 0.19 (s, 12H) ppm.
$^{13}$C NMR (100 MHz, 20° C., $C_6D_6$): δ=156.88 (C), 140.83 (2 CH), 139.74 (C), 131.60 (2 $CH_2$), 131.19 (2 CH), 114.15 (2 CH), 54.77 ($CH_3$), 0.40 (4 $CH_3$) ppm.
GC-MS (EI, 70 eV): m/z (%)=291 (M$^+$, 76), 276 (M$^+$-$CH_3$, 100), 260 (22), 248 (67), 222 (41), 176 (21), 134 (8), 85 (17).

N-[Dimethyl(vinyl)silyl]-N-(2-methoxyethyl)-1,1-dimethyl-1-vinylsilanamine

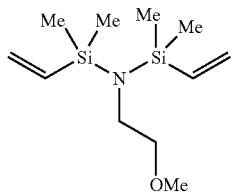

Chlorodimethylvinylsilane (20.1 g, 166 mmol, 2.5 equiv.) was added dropwise to a solution of methoxyethylamine (5.00 g, 66.6 mmol, 1.0 equiv.) and TEA (16.8 g, 166 mmol, 2.5 equiv.) in DCM (60 ml) at 25° C. The reaction mixture was stirred at 25° C. for 16 h. Filtration and removal of the solvent furnished a residue which was purified by vacuum distillation. The title compound (11.0 g, 45.2 mmol, 68%) was received as colorless oil.

$C_{11}H_{25}NOSi_2$, $M_w$=243.50 g mol$^{-1}$
bp=83-84° C. (7 mbar).
$^1$H NMR (400 MHz, 20° C., $C_6D_6$): δ=6.25 (dd, J=20.3 Hz, J=14.6 Hz, 2H), 5.90 (dd, J=14.7 Hz, J=3.8 Hz, 2H), 5.69 (dd, J=20.3 Hz, J=3.8 Hz, 2H), 3.21 (t, J=6.6 Hz, 2H), 3.09 (s, 3H), 3.08 (t, J=6.5 Hz, 2H), 0.23 (s, 12H) ppm.
$^{13}$C NMR (100 MHz, 20° C., $C_6D_6$): δ=141.10 (2 CH), 131.50 (2 $CH_2$), 75.78 ($CH_2$), 58.59 ($CH_3$), 44.90 ($CH_2$), 0.52 (4 $CH_3$) ppm.
GC-MS (EI, 70 eV): m/z (%)=243 (M$^+$-$CH_3$, 2), 198 (100), 170 (6), 142 (1), 112 (6), 85 (24), 59 (25).

N,N-Bis[dimethyl(vinyl)silyl]-O-methylhydroxylamine

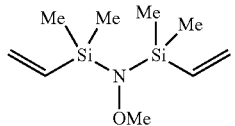

Methoxyaminehydrochloride (4.83 g, 57.8 mmol, 1.0 equiv.) was suspended in DCM (150 ml) at rt. Then TEA (17.6 g, 174 mmol, 3.0 equiv.) was added followed by dropwise addition of chlorodimethylvinylsilane (16.0 g, 133 mmol, 2.3 equiv.) at 25° C. The reaction mixture was stirred at 25° C. for 4 d. Filtration and removal of the solvent furnished a residue which was purified by vacuum distillation. The title compound (4.64 g, 21.6 mmol, 37%) was received as colorless oil.

$C_9H_{21}NOSi_2$, $M_w$=215.44 g mol$^{-1}$
bp=89-90° C. (40 mbar).
$^1$H NMR (400 MHz, 20° C., $C_6D_6$): δ=6.28 (dd, J=20.4 Hz, J=14.7 Hz, 2H), 5.92 (dd, J=14.8 Hz, J=3.8 Hz, 2H), 5.75 (dd, J=20.4 Hz, J=3.8 Hz, 2H), 3.37 (s, 3H), 0.23 (s, 12H) ppm.
$^{13}$C NMR (100 MHz, 20° C., $C_6D_6$): δ=139.23 (2 CH), 132.27 (2 $CH_2$), 65.30 ($CH_3$), −1.33 (4 $CH_3$) ppm.
GC-MS (EI, 70 eV): m/z (%)=215 (M$^+$, 100), 200 (M$^+$-$CH_3$, 1), 186 (8), 170 (53), 142 (56), 116 (41), 85 (60), 59 (86).

N—[Dimethyl(vinyl)silyl]-1,1-dimethyl-N-(pyridine-3-ylmethyl)-1-vinylsilanamine

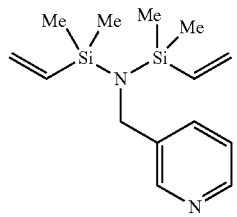 [SMILES: C=C[Si](C)(C)N(Cc1cccnc1)[Si](C)(C)C=C]

2-Aminomethylpyridine (3.92 g, 36.2 mmol, 1.0 equiv.) was added to a solution of TEA (9.16 g, 90.5 mmol, 2.5 equiv.) and chlorodimethylvinylsilane (10.9 g, 90.5 mmol, 2.5 equiv.) in DCM (60 ml) at 25° C. The reaction mixture was stirred at 25° C. for 5 d. Filtration and removal of the solvent furnished a residue which was purified by vacuum distillation. The title compound (8.78 g, 31.8 mmol, 88%) was received as colorless oil.

$C_{14}H_{24}N_2Si_2$, $M_w$=276.53 g mol$^{-1}$
bp=110-112° C. (7 mbar).
$^1$H NMR (400 MHz, 20° C., $C_6D_6$): δ=8.67 (dd, J=2.2 Hz, J=0.8 Hz, 1H), 8.49-8.47 (m, 1H), 7.32-7.29 (m, 1H), 6.78 (ddd, J=7.8 Hz, J=4.8 Hz, J=0.4 Hz, 1H), 6.13 (dd, J=20.3 Hz, J=14.7 Hz, 2H), 5.83 (dd, J=14.7 Hz, J=3.8 Hz, 2H), 5.61 (dd, J=20.3 Hz, J=3.8 Hz, 2H), 3.89 (s, 2H), 0.11 (s, 12H) ppm.
s $^{13}$C NMR (100 MHz, 20° C., $C_6D_6$): δ=149.33 (CH), 148.38 (CH), 140.12 (2 CH), 138.82 (C), 133.70 (CH), 132.02 (2 $CH_2$), 122.88 (CH), 46.79 ($CH_2$), 0.18 (4 $CH_3$) ppm.
GC-MS (EI, 70 eV): m/z (%)=276 (M$^+$, 30), 261 (M$^+$-$CH_3$, 100), 233 (15), 198 (32), 163 (28), 136 (12), 116 (10), 85 (35), 59 (53).

2,4-Dimethyl-1,3-dipropyl-2,4-divinyl-1,3,2,4-diazadisiletidine

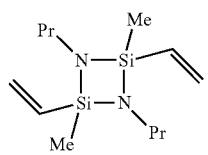

1-Methyl-N,N'-dipropyl-1-vinylsilanediamine (2.00 g, 10.7 mmol, 1.0 equiv.) was dissolved in MTBE (25 ml) at 25° C. Afterwards nBuLi-solution (7.05 g, 22.0 mmol, 2.05 equiv.) in cyclohexane (20 wt %) was added over 30 min. After 1 h a solution of chlorodimethylvinylsilane (1.51 g, 10.7 mmol, 1.0 equiv.) in MTBE (10 ml) was added and the resulting mixture was stirred for a further 1 h at 25° C. Filtration and removal of the solvent furnished a residue which was purified by vacuum distillation. The title compound (1.0 g, 3.9 mmol, 37%) was received as colorless oil.

$C_{12}H_{26}N_2Si_2$, $M_w$=254.52 g mol$^{-1}$ bp=78-80° C. (6 mbar).

$^1$H NMR (400 MHz, 20° C., $C_6D_6$): δ=6.21 (ddd, J=20.2 Hz, J=14.6 Hz, J=10.4 Hz, 2H) part of ABX-system, 6.02 (ddd, J=14.7 Hz, J=5.2 Hz, J=4.1 Hz, 2H) part of ABX-system, 5.87 (ddd, J=20.2 Hz, J=7.7 Hz, J=4.1 Hz, 2H) part of ABX-system, 2.78-2.73 (m, 4H), 1.41 (sext, J=7.2 Hz, 4H), 0.84 (t, J=7.2 Hz, 6H), 0.40 (s, 3H), 0.38 (s, 3H) ppm.

$^{13}$C NMR (100 MHz, 20° C., $C_6D_6$): δ=140.12 (CH), 139.97 (CH), 134.22 ($CH_2$), 134.18 ($CH_2$), 43.98 (2 $CH_2$) 28.21 (2 $CH_2$), 11.99 (2 $CH_3$), −0.72 ($CH_3$) −0.92 ($CH_3$) ppm.

GC-MS (EI, 70 eV): m/z (%)=254 (M$^+$, 1), 225 (M$^+$, 100), 198 (29), 170 (6), 128 (7), 98 (24), 85 (8), 71 (27).

1,3-Bis[dimethyl(vinyl)silyl]-2,2-dimethyl-1,3,2-diazasilinane (*)

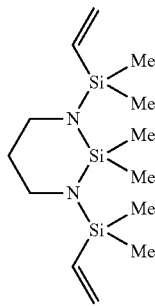 [SMILES: C=C[Si](C)(C)N1CCCN([Si](C)(C)C=C)[Si]1(C)C]

A solution of 1,3-diaminopropane (3.72 g, 50.2 mmol, 1.0 equiv.) in 30 ml DCM was added dropwise to a solution of TEA (21.8 g, 216 mmol, 4.3 equiv.) and dichlorodimethylsilane (6.51 g, 50.2 mmol, 1.0 equiv.) in DCM (70 ml) at 25° C. The reaction mixture was stirred at 25° C. for 16 h. Afterwards chlorodimethylvinylsilane (12.1 g, 100 mmol, 2.0 equiv.) was added and the resulting suspension was stirred at 25° C. for a further 16 h. Filtration and removal of the solvent furnished a residue which was purified by vacuum distillation. The title compound (11.1 g, 37.2 mmol, 74%) was received as colorless oil.

$C_{13}H_{30}N_2Si_3$, $M_w$=298.65 g mol$^{-1}$ bp=115-117° C. (7 mbar).

$^1$H NMR (400 MHz, 20° C., $C_6D_6$): δ=6.21 (dd, J=20.3 Hz, J=14.7 Hz, 2H), 5.93 (dd, J=14.6 Hz, J=4.0 Hz, 2H), 5.74 (dd, J=20.3 Hz, J=4.0 Hz, 2H), 2.98-2.95 (m, 4H), 1.49-1.43 (m, 2H), 0.30 (s, 6H), 0.19 (s, 12H) ppm.

$^{13}$C NMR (100 MHz, 20° C., $C_6D_6$): δ=140.67 (2 CH), 131.55 (2 $CH_2$) 42.50 (2 $CH_2$), 31.93 ($CH_2$), 3.96 (2 $CH_3$), −0.24 (4 $CH_3$) ppm.

GC-MS (EI, 70 eV): m/z (%)=298 (M$^+$, 14), 283 (M$^+$-$CH_3$, 100), 255 (8), 228 (7), 184 (13), 158 (8), 130 (5), 100 (1).

1,2-Bis{3-[dimethyl(vinyl)silyl]-2,2-dimethyl-1,3,2-diazasilolidin-1-yl}ethane (*)

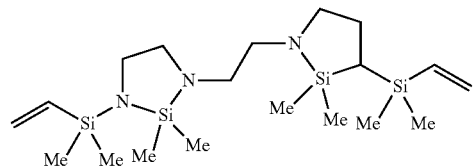 [SMILES: C=C[Si](C)(C)C1CCN(CCN2CCN([Si](C)(C)C=C)[Si]2(C)C)[Si]1(C)C]

Chlorodimethylvinylsilane (4.3. g, 35.9 mmol, 2.1 equiv.) was added to a solution of triethylenetetramine (2.50 g, 17.1 mmol, 1.0 equiv.) and TEA (11.2 g, 111 mmol, 6.5 equiv.) in DCM (50 ml) at 25° C. The reaction mixture was stirred at 25° C. for 1 h. Then dichlorodimethylsilane (4.41 g, 34.2 mmol, 2.0 equiv.) was added and the resulting suspension was stirred at 25° C. for a further 1 d. Filtration and removal of the solvent furnished a residue which was purified by vacuum distillation. The title compound (772 mg, 1.81 mmol, 11%) was received as slightly yellow, highly viscous oil.

$C_{18}H_{42}N_4Si_4$, $M_w$=426.90 g mol$^{-1}$ bp=152-154° C. (1.7×10$^{-2}$ mbar).

$^1$H NMR (400 MHz, 20° C., $C_6D_6$): δ=6.20 (dd, J=20.2 Hz, J=14.7 Hz, 2H), 5.96 (dd, J=14.6 Hz, J=4.0 Hz, 2H), 5.76 (dd, J=20.2 Hz, J=4.0 Hz, 2H), 3.06 (t, J=6.2 Hz, 4H), 2.95-2.85 (m, 8H), 0.21 (s, 12H), 0.20 (s, 12H) ppm.

$^{13}$C NMR (100 MHz, 20° C., $C_6D_6$): δ=139.54 (2 CH), 132.04 (2 $CH_2$), 50.75 (2 $CH_2$), 48.10 (2 $CH_2$), 45.30 (2 $CH_2$), 1.77 (4 $CH_3$), −1.48 (4 $CH_3$) ppm.

GC-MS (EI, 70 eV): m/z (%)=426 (M$^+$, 4), 411 (M$^+$-$CH_3$, 3), 320 (9), 278 (2), 213 (100), 199 (1), 185 (2), 171 (2), 157 (1), 142 (3), 100 (4), 85 (6).

1,4-Bis[dimethyl(vinyl)silyl]piperazine (M1) (*)

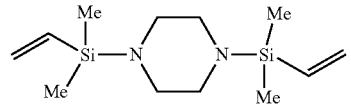 [SMILES: C=C[Si](C)(C)N1CCN([Si](C)(C)C=C)CC1]

Piperazine (8.00 g, 92.9 mmol) was dissolved in DCM (150 ml) at rt. TEA (21.6 g, 214 mmol, 2.3 equiv.) was added followed by dropwise addition of chlorodimethylvinylsilane (25.8 g, 214 mmol, 2.3 equiv.) at 25° C. The reaction mixture was stirred at 25° C. for 7 d. Filtration and removal of the solvent furnished a residue which was purified by vacuum distillation. The title compound M1 (17.4 g, 68.4 mmol, 74%) was received as colorless oil.

$C_{12}H_{26}N_2Si_2$, $M_w$=254.52 g mol$^{-1}$ bp=92-93° C. (5 mbar).

$^1$H NMR (400 MHz, 20° C., $C_6D_6$): δ=6.14 (dd, J=20.2 Hz, J=14.7 Hz, 2H), 5.94 (dd, J=14.7 Hz, J=4.1 Hz, 2H), 5.73 (dd, J=20.2 Hz, J=4.1 Hz, 2H), 2.97 (s, 8H), 0.12 (s, 12H) ppm.

$^{13}$C NMR (100 MHz, 20° C., $C_6D_6$): δ=139.34 (2 CH), 132.15 (2 $CH_2$), 47.36 (4 $CH_2$), −2.43 (4 $CH_3$) ppm.

GC-MS (EI, 70 eV): m/z (%)=254 (M$^+$, 100), 239 (M$^+$-$CH_3$, 9), 210 (2), 170 (9), 140 (20), 85 (44).

N,N-Bis[dimethyl(vinyl)silyl]benzylamine (M2)

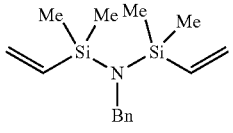 [SMILES: C=C[Si](C)(C)N(Cc1ccccc1)[Si](C)(C)C=C]

Benzylamine (6.00 g, 56.0 mmol, 1.0 equiv.) was dissolved in DCM (110 ml) at rt. TEA (14.2 g, 140 mmol, 2.5 equiv.) was added followed by dropwise addition of chlorodimethylvinylsilane (16.9 g, 140 mmol, 2.5 equiv.) at 25° C. The reaction mixture was stirred at 25° C. for 3 d. Filtration and removal of the solvent furnished a residue which was purified by vacuum distillation. The title compound M2 (8.96 g, 32.5 mmol, 58%) was received as colorless oil.

$C_{15}H_{25}NSi_2$, $M_w$=275.54 g mol$^{-1}$
bp=109-113° C. (5 mbar).
$^1$H NMR (400 MHz, 20° C., $C_6D_6$): δ=7.28-7.24 (m, 2H), 7.21-7.17 (m, 2H), 7.07 (t, J=7.5 Hz, 1H), 6.23 (dd, J=20.4 Hz, J=14.7 Hz, 2H), 5.87 (dd, J=14.7 Hz, J=3.8 Hz, 2H), 5.66 (dd, J=20.3 Hz, J=3.8 Hz, 2H), 4.08 (s, 2H), 0.19 (s, 12H) ppm.
$^{13}$C NMR (100 MHz, 20° C., $C_6D_6$): δ=144.14 (C), 140.61 (2 CH), 131.71 (2 CH$_2$), 128.34 (2 CH), 126.75 (2 CH), 126.52 (CH), 49.14 (CH$_2$), 0.29 (4 CH$_3$) ppm.
GC-MS (EI, 70 eV): m/z (%)=275 (M$^+$, 14), 260 (M$^+$-CH$_3$, 100), 232 (14), 198 (66), 162 (25), 135 (23), 116 (10), 85 (41), 59 (64).

N,N-Bis[dimethyl(vinyl)silyl]toluidin (M3)

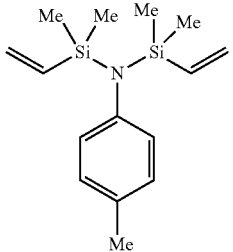 [SMILES: C=C[Si](C)(C)N(c1ccc(C)cc1)[Si](C)(C)C=C]

Toluidin (3.89 g, 36.3 mmol, 1.0 equiv.) and TEA (9.18 g, 90.7 mmol, 2.5 equiv.) were dissolved in DCM (60 ml) at rt. Then chlorodimethylvinylsilane (10.9 g, 90.7 mmol, 2.5 equiv.) was added dropwise at 25° C. The reaction mixture was stirred at 25° C. for 3 d. Then a second portion of chlorodimethylvinylsilane (2.20 g, 18.2 mmol, 0.5 equiv.) was added and the resulting mixture was stirred for a further 6 d at 25° C. Filtration and removal of the solvent furnished a residue which was purified by vacuum distillation. The title compound M3 (7.70 g, 27.9 mmol, 77%) was received as colorless oil.

$C_{15}H_{25}NSi_2$, $M_w$=275.54 g mol$^{-1}$
bp=100-102° C. (4 mbar).
$^1$H NMR (400 MHz, 20° C., $C_6D_6$): δ=6.92-6.88 (m, 4H), 6.29 (dd, J=20.4 Hz, J=14.7 Hz, 2H), 5.90 (dd, J=14.7 Hz, J=3.7 Hz, 2H), 5.71 (dd, J=20.3 Hz, J=3.8 Hz, 2H), 2.09 (s, 3H), 0.18 (s, 12H) ppm.
$^{13}$C NMR (100 MHz, 20° C., $C_6D_6$): δ=144.65 (C), 140.83 (2 CH), 133.39 (C), 131.62 (2 CH$_2$), 130.27 (2 CH), 129.60 (2 CH), 20.84 (CH$_3$), 0.44 (4 CH$_3$) ppm.
GC-MS (EI, 70 eV): m/z (%)=275 (M$^+$, 74), 260 (M$^+$-CH$_3$, 99), 246 (23), 232 (100), 222 (60), 206 (55), 174 (21), 148 (13), 121 (5), 85 (32), 59 (91).

N,N,N',N'-Tetrakis[dimethyl(vinyl)silyl-1,3-diaminopropane (M4) (*)

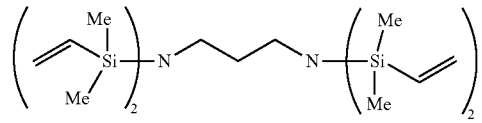

1,3-Diaminopropane (1.50 g, 20.2 mmol, 1.0 equiv.) was added dropwise to a solution of TEA (12.3 g, 121.4 mmol, 6.0 equiv.) and chlorodimethylvinylsilane (13.1 g, 101.2 mmol, 5.0 equiv.) in DCM (70 ml) at 25° C. The reaction mixture was stirred at 25° C. for 4 d. Filtration and removal of the solvent furnished a residue which was purified by vacuum distillation. The title compound M4 (7.15 g, 17.4 mmol, 86%) was received as colorless oil.

$C_{19}H_{42}N_2Si_4$, $M_w$=410.90 g mol$^{-1}$
bp=144-147° C. (3×10$^{-2}$ mbar).
$^1$H NMR (400 MHz, 20° C., $C_6D_6$): δ=6.27 (dd, J=20.6 Hz, J=14.6 Hz, 4H), 5.94 (dd, J=14.6 Hz, J=3.8 Hz, 4H), 5.73 (dd, J=20.3 Hz, J=3.9 Hz, 4H), 2.67-2.63 (m, 4H), 1.70-1.62 (m, 2H), 0.26 (s, 24H) ppm.
$^{13}$C NMR (100 MHz, 20° C., $C_6D_6$): δ=141.04 (4 CH), 131.55 (4 CH$_2$), 43.24 (2 CH$_2$), 41.34 (CH$_2$), 0.53 (8 C$_{H3}$) ppm.
GC-MS (EI, 70 eV): m/z (%)=410 (M$^+$, 64), 395 (M$^+$-CH$_3$, 12), 309 (3), 198 (100), 142 (6), 85 (26).

N,N-Bis[dimethyl(vinyl)silyl]methylamine (M5)

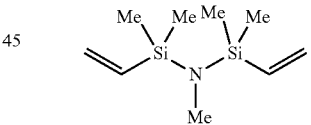

Chlorodimethylvinylsilane (30.2 g, 251 mmol, 2.3 equiv.) was dissolved in DCM (120 ml) at rt. Then methylammonium chloride (6.77 g, 100 mmol, 1.0 equiv.) was added followed by dropwise addition of a solution of TEA (36.5 g, 361 mmol, 3.6 equiv.) in DCM (30 ml) at 25° C. The reaction mixture was stirred at 25° C. for 3 d. Filtration and removal of the solvent furnished a residue which was purified by vacuum distillation. The title compound M5 (13.9 g, 697 mmol, 70%) was received as colorless oil.

$C_9H_{21}NSi_2$, $M_w$=199.44 g mol$^{-1}$
bp=75-76° C. (30 mbar).
$^1$H NMR (400 MHz, 20° C., $C_6D_6$): δ=6.20 (dd, J=20.2 Hz, J=14.6 Hz, 2H), 5.92 (dd, J=14.6 Hz, J=3.9 Hz, 2H), 5.70 (dd, J=20.3 Hz, J=4.0 Hz, 2H), 2.42 (s, 3H), 0.19 (s, 12H) ppm.
$^{13}$C NMR (100 MHz, 20° C., $C_6D_6$): δ=140.52 (2 CH), 131.49 (2 CH$_2$), 31.46 (CH$_3$), −0.26 (4 CH$_3$) ppm.

GC-MS (EI, 70 eV): m/z (%)=199 (M$^+$, 16), 185 (M$^+$-CH$_3$, 100), 172 (14), 156 (48), 144 (15), 130 (15), 116 (10), 103 (4), 73 (21), 59 (51).

N,N-Bis[dimethyl(vinyl)silyl]propylamine (M6)

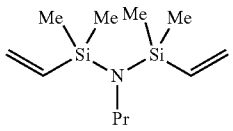

Propylamine (4.00 g, 67.7 mmol, 1.0 equiv.) was dissolved in DCM (120 ml) at rt. TEA (17.1 g, 169 mmol, 2.5 equiv.) was added followed by dropwise addition of chlorodimethylvinylsilane (20.4 g, 169 mmol, 2.5 equiv.) at 25° C. The reaction mixture was stirred at 25° C. for 18 h. Filtration and removal of the solvent furnished a residue which was purified by vacuum distillation. The title compound M6 (10.3 g, 45.3 mmol, 67%) was received as colorless oil.

C$_{11}$H$_{25}$NSi$_2$, M$_w$=227.50 g mol$^{-1}$
bp=75-76° C. (10 mbar).
$^1$H NMR (400 MHz, 20° C., C$_6$D$_6$): δ=6.24 (dd, J=20.3 Hz, J=14.6 Hz, 2H), 5.91 (dd, J=14.6 Hz, J=3.9 Hz, 2H), 5.70 (dd, J=20.3 Hz, J=3.9 Hz, 2H), 2.75-2.71 (m, 2H), 1.45-1.35 (m, 2H), 0.71 (t, J=7.4 Hz, 3H), 0.22 (s, 12H) ppm.
$^{13}$C NMR (100 MHz, 20° C., C$_6$D$_6$): δ=141.21 (2 CH), 131.36 (2 CH$_2$), 47.98 (CH$_2$), 28.65 (CH$_2$), 11.35 (CH$_3$), 0.53 (4 CH$_3$) ppm.
GC-MS (EI, 70 eV): m/z (%)=227 (M$^+$, 0.8), 212 (M$^+$-CH$_3$, 5), 198 (100), 184 (3), 170 (7), 156 (2), 142 (3), 114 (15), 100 (7), 85 (50), 59 (57).

N,N-Bis[dimethyl(vinyl)silyl]butylamine (M7)

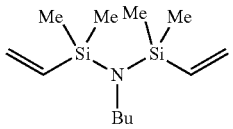

Butylamine (5.00 g, 68.4 mmol, 1.0 equiv.) was dissolved in DCM (120 ml) at rt. TEA (17.3 g, 170 mmol, 2.5 equiv.) was added followed by dropwise addition of chlorodimethylvinylsilane (20.6 g, 170 mmol, 2.5 equiv.) at 25° C. The reaction mixture was stirred at 25° C. for 2 d. Filtration and removal of the solvent furnished a residue which was purified by vacuum distillation. The title compound M7 (8.87 g, 36.7 mmol, 54%) was received as colorless oil.

C$_{12}$H$_{27}$NSi$_2$, M$_w$=241.52 g mol$^{-1}$
bp=75-76° C. (6 mbar).
$^1$H NMR (400 MHz, 20° C., C$_6$D$_6$): δ=6.26 (dd, J=20.3 Hz, J=14.7 Hz, 2H), 5.92 (dd, J=14.7 Hz, J=3.9 Hz, 2H), 5.72 (dd, J=20.2 Hz, J=3.8 Hz, 2H), 2.82-2.78 (m, 2H), 1.46-1.39 (m, 2H), 1.14 (sext, J=7.5 Hz, 2H), 0.84 (t, J=7.4 Hz, 3H), 0.24 (s, 12H) ppm.
$^{13}$C NMR (100 MHz, 20° C., C$_6$D$_6$): δ=141.24 (2 CH), 131.38 (2 CH$_2$), 45.83 (CH$_2$), 37.85 (CH$_2$), 20.58 (CH$_2$), 14.20 (CH$_3$), 0.56 (4 CH$_3$) ppm.

GC-MS (EI, 70 eV): m/z (%)=241 (M$^+$, 2), 226 (M$^+$-CH$_3$, 17), 198 (100), 170 (21), 154 (6), 128 (32), 112 (12), 85 (100), 59 (100).

N,N-Bis[dimethyl(vinyl)silyl]-2,2-dimethyl-2,3-dihydro-1H-benzo[d][1,3,2]diazasilol (M8) (*)

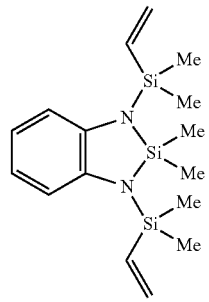 [SMILES: C=C[Si](C)(C)N1c2ccccc2N([Si](C)(C)C=C)[Si]1(C)C]

Dichlorodimethylsilane (4.02 g, 31.0 mmol, 1.0 equiv.) was added dropwise to a solution of o-phenylendiamine (3.35 g, 31.0 mmol, 1.0 equiv.) and TEA (15.7 g, 155 mmol, 5.0 equiv.) in DCM (100 ml) at 25° C. The reaction mixture was stirred at 25° C. for 16 h. Afterwards chlorodimethylvinylsilane (9.35 g, 77.5 mmol, 2.5 equiv.) was added and the resulting suspension was stirred at 25° C. for a further 3 d. Filtration and removal of the solvent furnished a residue which was purified by vacuum distillation. The title compound M8 (7.20 g, 21.6 mmol, 70%) was received as colorless oil.

C$_{16}$H$_{28}$N$_2$Si$_3$, M$_w$=332.67 g mol$^{-1}$
bp=135° C. (1.3×10$^{-2}$ mbar).
$^1$H NMR (400 MHz, 20° C., C$_6$D$_6$): δ=6.98 (dd, J=5.8 Hz, J=3.4 Hz, 2H), 6.78 (dd, J=5.8 Hz, J=3.4 Hz, 2H), 6.24 (dd, J=20.3 Hz, J=14.7 Hz, 2H), 5.90 (dd, J=14.7 Hz, J=3.6 Hz, 2H), 5.73 (dd, J=20.3 Hz, J=3.6 Hz, 2H), 0.34 (s, 6H), 0.30 (s, 12H) ppm.
$^{13}$C NMR (100 MHz, 20° C., C$_6$D$_6$): δ=142.45 (2 C), 138.09 (2 CH), 133.16 (2 CH$_2$), 118.51 (2 CH), 114.16 (2 CH), 5.54 (2 CH$_3$), −1.36 (4 CH$_3$) ppm.
GC-MS (EI, 70 eV): m/z (%)=275 (M$^+$, 14), 260 (M$^+$-CH$_3$, 100), 232 (14), 198 (66), 162 (25), 135 (23), 116 (10), 85 (41), 59 (64).

N,N,N',N'-Tetrakis[dimethyl(vinyl)silyl]-1,2-diaminoethane (M9) (*)

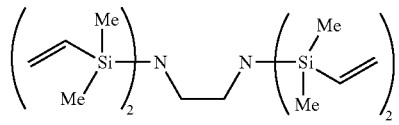

Ethylenediamine (1.00 g, 16.6 mmol) was dissolved in DCM (50 ml) at rt. TEA (10.1 g, 99.8 mmol, 6.0 equiv.) was added followed by dropwise addition of chlorodimethylvinylsilane (12.0 g, 99.8 mmol, 6.0 equiv.) at 25° C. The reaction mixture was stirred at 25° C. for 2 d. Filtration and removal of the solvent furnished a residue which was purified by vacuum distillation. The title compound M9 (3.71 g, 9.35 mmol, 56%) was received as colorless oil.

C$_{18}$H$_{40}$N$_2$Si$_4$, M$_w$=396.87 g mol$^{-1}$
bp=155-157° C. (1.7 mbar).

$^1$H NMR (400 MHz, 20° C., C$_6$D$_6$): δ=6.28 (dd, J=20.4 Hz, J=14.7 Hz, 4H), 5.92 (dd, J=14.7 Hz, J=3.8 Hz, 4H), 5.71 (dd, J=20.3 Hz, J=3.8 Hz, 4H), 2.95 (s, 4H), 0.28 (s, 24H) ppm.
$^{13}$C NMR (100 MHz, 20° C., C$_6$D$_6$): δ=141.59 (4 CH), 131.66 (4 CH$_2$), 49.41 (2 CH$_2$), 1.50 (8 CH$_3$) ppm.
GC-MS (EI, 70 eV): m/z (%)=396 (M$^+$, 0.8), 381 (M$^+$-CH$_3$, 3), 369 (1), 295 (6), 283 (8), 269 (14), 200 (100), 170 (31), 142 (14), 112 (19), 85 (100), 59 (100).

Tris[dimethyl(vinyl)silyl]amine (M10)

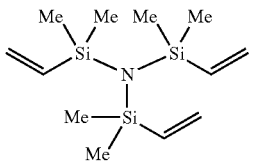 [SMILES: C=C[Si](C)(C)N([Si](C)(C)C=C)[Si](C)(C)C=C]

Bis[dimethyl(vinyl)silyl]amine (6.50 g, 35.1 mmol, 1.0 equiv.) was dissolved in THF (60 ml) at 25° C. Afterwards nBuLi-solution (11.8 g, 36.8 mmol, 1.05 equiv.) in cyclohexane (20 wt %) was added. After 1 h at this temperature chlorodimethylvinylsilane (5.29 g, 43.8 mmol, 1.25 equiv.) was added and the resulting mixture was stirred for a further 16 h at 25° C. Filtration and removal of the solvent furnished a residue which was purified by vacuum distillation. The title compound M10 (7.00 g, 26.0 mmol, 74%) was received as sticky oil/solid.

C$_{12}$H$_{27}$NSi$_3$, M$_w$=269.61 g mol$^{-1}$
bp=85° C. (4 mbar).
$^1$H NMR (400 MHz, 20° C., CDCl$_3$): δ=6.26 (dd, J=20.3 Hz, J=14.7 Hz, 3H), 5.88 (dd, J=14.7 Hz, J=3.6 Hz, 3H), 5.66 (dd, J=20.4 Hz, J=3.6 Hz, 3H), 0.24 (s, 18H) ppm.
$^{13}$C NMR (100 MHz, 20° C., CDCl$_3$): δ=143.27 (3 CH), 130.40 (3 CH$_2$), 3.84 (6 CH$_3$) ppm.
GC-MS (EI, 70 eV): m/z (%)=369 (M$^+$, 0.5), 254 (M$^+$-CH$_3$, 100), 226 (M$^+$, 65), 200 (62), 172 (18), 154 (9), 130 (32), 100 (30), 59 (30).
Literature: J. Hu, D. Son, *Macromolecules* 1998, 31, 8644.

N$^1$,N$^1$,N$^4$,N$^4$-Tetrakis[dimethyl(vinyl)silyl]benzene-1,4-diamine (M11) (*)

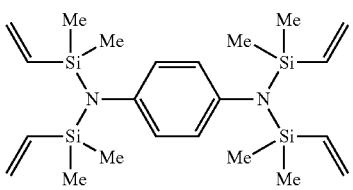 [SMILES: C=C[Si](C)(C)N(c1ccc(N([Si](C)(C)C=C)[Si](C)(C)C=C)cc1)[Si](C)(C)C=C]

Chlorodimethylvinylsilane (12.2 g, 101 mmol, 4.5 equiv.) was added dropwise to a solution of p-phenylendiamine (2.43 g, 22.5 mmol, 1.0 equiv.) and TEA (10.5 g, 104 mmol, 4.6 equiv.) in DCM (60 ml) at 25° C. The reaction mixture was stirred at 25° C. for 3 d. Afterwards the solvent was reduced to 50% and chlorodimethylvinylsilane (1.35 g, 11.2 mmol, 0.5 equiv.) was added to increase the reaction rate. The resulting suspension was stirred at 25° C. for a further 21 d. Filtration and removal of the solvent furnished a residue which was purified by vacuum distillation. The title compound M11 (6.40 g, 14.4 mmol, 64%) was received as colorless oil.

C$_{22}$H$_{40}$N$_2$Si$_4$, M$_w$=442.92 g mol$^{-1}$
bp=162-164° C. (3.5×10$^{-2}$ mbar).
$^1$H NMR (400 MHz, 20° C., C$_6$D$_6$): δ=6.81 (s, 4H), 6.28 (dd, J=20.4 Hz, J=14.7 Hz, 4H), 5.91 (dd, J=14.9 Hz, J=3.8 Hz, 4H), 5.71 (dd, J=20.3 Hz, J=3.8 Hz, 4H), 0.18 (s, 24H) ppm.
$^{13}$C NMR (100 MHz, 20° C., C$_6$D$_6$): δ=143.35 (2 C), 140.74 (4 CH), 131.67 (4 CH$_2$), 130.42 (4 CH), 0.23 (8 CH$_3$) ppm.
GC-MS (EI, 70 eV): m/z (%)=444 (M$^+$, 100), 429 (M$^+$-CH$_3$, 9), 415 (5), 401 (32), 387 (6), 373 (9), 359 (7), 345 (2), 331 (2), 289 (2), 259 (5), 218 (2), 173 (10), 130 (9), 100 (5), 85 (29).

N$^1$-<2-{Bis[dimethyl(vinyl)silyl]amino}ethyl>-N$^1$, N$^2$,N$^2$-tris[dimethyl(vinyl)silyl]ethane-1,2-diamine (M12) (*)

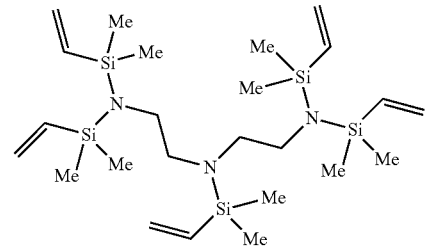 [SMILES: C=C[Si](C)(C)N(CCN([Si](C)(C)C=C)[Si](C)(C)C=C)CCN([Si](C)(C)C=C)[Si](C)(C)C=C]

Diethylenetrieamine (3.00 g, 29.1 mmol, 1.0 equiv.) was dissolved in DCM (125 ml) at rt. TEA (19.1 g, 189 mmol, 6.5 equiv.) was added followed by dropwise addition of chlorodimethylvinylsilane (22.8 g, 189 mmol, 6.5 equiv.) at 25° C. The reaction mixture was stirred at 25° C. for 7 d. Filtration and removal of all volatile materials furnished the title compound M12 (12.0 g, 23.0 mmol, 79%, purity: 91%) as yellow oil.

C$_{24}$H$_{53}$N$_3$Si$_5$, M$_w$=524.13 g mol$^{-1}$
$^1$H NMR (400 MHz, 20° C., C$_6$D$_6$): δ=6.29 (dd, J=20.3 Hz, J=14.6 Hz, 5H), 5.94 (dd, J=14.6 Hz, J=3.8 Hz, 5H), 5.74 (dd, J=20.3 Hz, J=3.8 Hz, 2H), 2.99-2.95 (m, 4H), 2.86-2.84 (m, 4H), 0.29 (s, 24H), 0.24 (s, 6H) ppm.
$^{13}$C NMR (100 MHz, 20° C., C$_6$D$_6$): δ=141.26 (4 CH), 140.28 (CH), 132.23 (4 CH$_2$), 131.73 (CH$_2$), 53.43 (2 CH$_2$), 47.25 (2 CH$_2$), 1.09 (8 CH$_3$), −0.64 (2 CH$_3$) ppm.
GC-MS (EI, 70 eV): m/z (%)=524 (M$^+$, 0.1), 325 (100), 283 (12), 212 (100), 198 (89), 172 (5), 128 (24), 85 (82).

N$^1$,N$^6$-(Ethane-1,2-diyl)bis{N$^1$,N$^2$,N$^2$-tris[dimethyl (vinyl)silyl]ethane-1,2-diamine} (M13) (*)

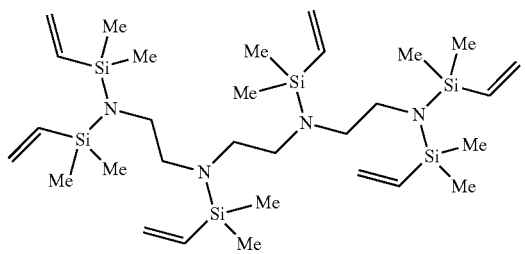 [SMILES: C=C[Si](C)(C)N(CCN(CCN([Si](C)(C)C=C)[Si](C)(C)C=C)[Si](C)(C)C=C)CCN([Si](C)(C)C=C)[Si](C)(C)C=C]

Triethylenetetramine (2.00 g, 13.7 mmol, 1.0 equiv.) was dissolved in DCM (60 ml) at rt. TEA (11.1 g, 109 mmol, 8.0 equiv.) was added followed by dropwise addition of chlorodimethylvinylsilane (13.2 g, 109 mmol, 8.0 equiv.) at 25° C. The reaction mixture was stirred at 25° C. for 7 d.

Filtration and removal of all volatile materials furnished the title compound M13 (6.15 g, 9.44 mmol, 69%, purity: 80% of main isomer) as yellow oil.

$C_{30}H_{66}N_4Si_6$, $M_w$=651.40 g mol$^{-1}$ $^1$H NMR (400 MHz, 20° C., $C_6D_6$): δ=6.30 (dd, J=20.3 Hz, J=14.6 Hz, 4H), 6.25 (dd, J=20.0 Hz, J=14.8 Hz, 2H), 5.97 (dd, J=14.7 Hz, J=3.9 Hz, 2H), 5.96 (dd, J=14.6 Hz, J=3.8 Hz, 4H), 5.76 (dd, J=20.2 Hz, J=3.9 Hz, 2H), 5.75 (dd, J=20.3 Hz, J=3.8 Hz, 4H), 3.00-2.82 (m, 12H), 0.30 (s, 24H), 0.26 (s, 12H) ppm.

$^{13}$C NMR (100 MHz, 20° C., $C_6D_6$): δ=141.14 (4 CH), 140.15 (2 CH), 132.18 (2 $CH_2$), 131.81 (4 $CH_2$), 52.74 (2 $CH_2$), 50.06 (2 $CH_2$), 46.52 (2 $CH_2$), 0.96 (8 $CH_3$), −0.91 (4 $CH_3$) ppm.

GC-MS (EI, 70 eV): major isomer m/z (%)=452 (M$^+$-199, 32), 369 (3), 325 (100), 256 (19), 212 (100), 198 (73), 142 (32), 85 (27); minor isomer m/z (%)=452 (M$^+$-199, 100), 212 (2). Ratio 4.8:1 (GC)

Polymerization Procedures

General Polymerization Procedure: Examples A-S, Y, Z and Lit Ref 1+2

Cyclohexane (amount given in tables 1-5), butadiene (98.3% of amount given in tables 1-6) and styrene (amount given in table) were charged to an air-free 10 l (or 5 l) reactor and the stirred mixture was heated up to 40° C. Then TMEDA (amount is given in table) and branching agent (BA) (amount and modifier is given in tables 1-5) was added and n-butyllithium was charged dropwise to react the impurities until the color of the reaction mixture changed to yellowish (titration). After that the recipe amount of initiator in cyclohexane corresponding to the target molecular weight of the polymer was charged immediately to start the polymerization. The start time of the charge of the initiator was used as the start time of the polymerization. Parallel the temperature was increased by heating or cooling in the wall of the reactors beginning with the charge of the initiator to the final polymerization temperature of 60° C. for 80 min. Then butadiene (1.7% of amount given in table) was charged. After 5 min chain end modifier 3-methoxy-3,8,8,9,9-pentamethyl-2-oxa-7-thia-3,8-disiladecane (20 (amount given in tables 1-5) was added. The reaction was terminated after 20 min with charge of methanol. The polymer solution was stabilized with Irganox 1520D, the polymer recovered by steam stripping and dried until a content of residual volatiles <0.6% was obtained. The complete data set of the sample is given in tables 1-5.

Polymerization Procedure: Example T

Cyclohexane (amount given in table 4), butadiene (100% of amount given in table 4) was charged to an air-free 5 l reactor and the stirred mixture was heated up to 40° C. Then TMEDA (62.4 mmol), phenanthroline (indicator) and branching agents M1 and M12 (3.25 mmol each) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Parallel the temperature was increased by heating or cooling in the wall of the reactors beginning with the charge of the initiator to the final polymerization temperature of 60° C. for 60 min. Then the reaction was terminated with charge of methanol. The polymer solution was stabilized with Irganox 1520D. The complete data set of the sample is given in table 4.

Polymerization Procedure: Example U

Cyclohexane (amount given in table 4), butadiene (75% of amount given in table 4) was charged to an air-free 5 l reactor and the stirred mixture was heated up to 60° C. Then TMEDA (amount is given in table 4), phenanthroline (indicator) and branching agent (BA) (amount and modifier is given in table 4) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Parallel the temperature was increased (0.8 K/min) by heating or cooling in the wall of the reactors beginning with the charge of the initiator to the final polymerization temperature of 80° C. for 80 min. Simultaneously, butadiene (25% of amount given in table) was charged slowly over 15 min. Then chain end modifier N (amount given in table 4) was added. The reaction was terminated after 20 min with charge of methanol. The polymer solution was stabilized with Irganox 1520D. The complete data set of the sample is given in table 4.

Polymerization Procedure: Example V

Cyclohexane (amount given in table 4), butadiene (30% of amount given in table 4) and styrene (amount given in table) were charged to an air-free 5 l reactor and the stirred mixture was heated up to 60° C. Then TMEDA (amount is given in table) and branching agent M1 (amount is given in table 4) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Parallel the temperature was increased (0.5 K/min) by heating or cooling in the wall of the reactors beginning with the charge of the initiator to the final polymerization temperature of 85° C. Simultaneously, butadiene (34% of amount given in table 4, flow rate 1.6 g/min) was charged, followed by a second incremental dosing of butadiene (21% of amount given in table 4, flow rate 1.0 g/min) and followed by a last incremental dosing of butadiene (14% of amount given in table 4, flow rate 0.7 g/min). After 30 min stirring at 85° C. butadiene (1% of amount given in table 4) was charged. After 5 min chain end modifier P (amount given in table 4) was added. The reaction was terminated after 10 min with charge of methanol. The polymer solution was stabilized with Irganox 1520D. The complete data set of the sample is given in table 4.

Polymerization Procedure: Example W

Cyclohexane (amount given in table 4), butadiene (50% of amount given in table 4) and styrene (65% of amount given in table) were charged to an air-free 5 l reactor and the stirred mixture was heated up to 40° C. Then TMEDA (amount is given in table) and branching agent M12 (amount is given in table 4) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Parallel the temperature was increased (0.25 K/min) by heating or cooling in the wall of the reactors beginning with the charge of the initiator to the final polymerization temperature of 60° C. Simultaneously, butadiene (50% of amount given in table 4, flow rate 2.1 g/min) and styrene (34% of amount given in table 4, flow rate 0.6 g/min) were charged. Then styrene (1% of amount given in table 4) was charged. The reaction was terminated after 5 min with charge of methanol. The polymer solution was stabilized with Irganox 1520D. 112.4 g (37.5 phr) of TDAE oil (Vivatec 500) was added and the solution was stirred with a mechanical mixer. As a result, the Mooney viscosity was decreased from 119.5 MU to 36.9 MU. The complete data set of the sample is given in table 4.

Polymerization Procedure: Example X

Cyclohexane (amount given in table 4), butadiene 45% of amount given in table 4) and styrene (66% of amount given in table 4) were charged to an air-free 5 l reactor and the stirred mixture was heated up to 55° C. Then TMEDA (amount is given in table) and branching agent M12 (0.82 mmol) were added and n-butyllithium was charged dropwise to react the impurities until the color of the reaction mixture changed to yellowish (titration). After that the recipe amount of NB in cyclohexane corresponding to the target molecular weight of the polymer was charged immediately to start the polymerization. The start time of the charge of the initiator was used as the start time of the polymerization. Parallel the temperature was increased (1 K/min) by heating or cooling in the wall of the reactors beginning with the charge of the initiator to the final polymerization temperature of 70° C. Simultaneously, butadiene (54% of amount given in table 4, flow rate 3.1 g/min) and styrene (34% of amount given in table 4, flow rate 0.3 g/min) were charged. Then butadiene (1% of amount given in table 4) was charged. After 5 min branching agent M1 (1.94 mmol) was added. 5 min later chain end modifier P (2.30 mmol) was added. The reaction was terminated after 10 min with charge of methanol. The polymer solution was stabilized with Irganox 1520D. The complete data set of the sample is given in table 4.

Comp Ex. 1

Cyclohexane (4652 g), butadiene (682.3 g) and styrene (186.1 g) were charged to an air-free 10 l reactor and the stirred mixture was heated up to 40° C. Then TMEDA (1.02 g) was added and n-butyllithium was charged dropwise to react the impurities until the color of the reaction mixture changed to yellowish (titration). After that the recipe amount of NB (4.39 mmol, c=0.250 mol/kg) in cyclohexane corresponding to the target molecular weight of the polymer was charged immediately to start the polymerization. The start time of the charge of the initiator was used as the start time of the polymerization. Parallel the temperature was increased by heating or cooling in the wall of the reactors beginning with the charge of the initiator to the final polymerization temperature of 60° C. for 80 min. Then butadiene (3.6 g) was charged followed by $SnCl_4$ (0.31 mmol) and 50 g cyclohexane via cylinder. The reaction was allowed to complete within 15 minutes followed by the last addition of butadiene (12.5 g). After 5 min chain end modifier 3-methoxy-3,8,8,9,9-pentamethyl-2-oxa-7-thia-3,8-disiladecane (2f) (1.09 g) dissolved in 20 g cyclohexane was added. The reaction was terminated after 20 min with charge of methanol (10.8 g). The polymer solution was stabilized with Irganox 1520D (2.2 g), the polymer recovered by steam stripping and dried until a content of residual volatiles <0.6% was obtained. The complete data set of the sample is given in table 4.

Comp Ex. 2

Cyclohexane (4739 g), butadiene (649.2 g) and styrene (176.0 g) were charged to an air-free 10 l reactor and the stirred mixture was heated up to 40° C. Then TMEDA (2.32 g) and DV (0.37 g) were added and n-butyllithium was charged dropwise to react the impurities until the color of the reaction mixture changed to yellowish (titration). After that the recipe amount of NB (4.14 mmol, c=0.159 mol/kg) in cyclohexane corresponding to the target molecular weight of the polymer was charged immediately to start the polymerization. The start time of the charge of the initiator was used as the start time of the polymerization. Parallel the temperature was increased by heating or cooling in the wall of the reactors beginning with the charge of the initiator to the final polymerization temperature of 60° C. for 80 min. Then butadiene (11.2 g) was charged. The reaction was allowed to complete within 5 minutes. After 5 min chain end modifier 3-methoxy-3,8,8,9,9-pentamethyl-2-oxa-7-thia-3,8-disiladecane (2f) (1.24 g) dissolved in 20 g of cyclohexane was added. The reaction was terminated after 20 min with charge of methanol (10.1 g). The polymer solution was stabilized with Irganox 1520D (2.09 g), the polymer recovered by steam stripping and dried until a content of residual volatiles <0.6% was obtained. The complete data set of the sample is given in table 4.

Comp Ex. 3

Cyclohexane (4111 g), butadiene (559.7 g) and styrene (152.7 g) were charged to an air-free 10 l reactor and the stirred mixture was heated up to 40° C. Then TMEDA (0.84 g) was added and n-butyllithium was charged dropwise to react the impurities until the color of the reaction mixture changed to yellowish (titration). After that the recipe amount of NB (3.54 mmol, c 0.249 mol/kg) in cyclohexane corresponding to the target molecular weight of the polymer was charged immediately to start the polymerization. The start time of the charge of the initiator was used as the start time of the polymerization. Parallel the temperature was increased by heating or cooling in the wall of the reactors beginning with the charge of the initiator to the final polymerization temperature of 60° C. for 80 min followed by the second addition of butadiene (2.7 g). After 1 min coupling agent SiCl4 (1.98 g) dissolved in 20 g cyclohexane was added. After 15 min a third addition of butadiene (10.3 g) was made. After 5 min chain end modifier 3-methoxy-3,8,8,9,9-pentamethyl-2-oxa-7-thia-3,8-disiladecane (21) (1.08 g) dissolved in 20 g cyclohexane was added. The reaction was terminated after 20 min with charge of methanol (0.11 g). The polymer solution was stabilized with Irganox 1520D (1.81 g), the polymer recovered by steam stripping and dried until a content of residual volatiles <0.6% was obtained. The complete data set of the sample is given in table 4.

TABLE 1

Polymerisation 1.

| | A | B | C | D | E | F |
|---|---|---|---|---|---|---|
| Cyclohexane/g | 4461 | 4740 | 4740 | 4741 | 4741 | 4120 |
| Butadiene/g | 347.6 | 660.7 | 660.6 | 660.7 | 660.8 | 571.8 |
| Styrene/g | 96.8 | 176.0 | 176.0 | 176.0 | 176.0 | 152.3 |
| TMEDA/mmol | 3.83 | 8.27 | 8.27 | 8.27 | 8.27 | 7.06 |
| Initiator/mmol | NB 1.91 | NB 4.14 | NB 4.14 | NB 4.14 | NB 4.14 | NB 3.59 |
| BA/mmol | M1 3.93 | M1 1.69 | M1 2.91 | M2 16.8 | M3 4.54 | M4 1.85 |
| $SnCl_4$/mmol | — | — | — | — | — | — |
| Cpd 2f/mmol | 1.97 | 4.21 | 4.21 | 4.21 | 4.23 | 3.66 |
| Mp/kg/mol | 321 | 297 | 301 | 374 | 377 | 395 |
| Coupl. rate/% | 54.8 | 24.7 | 41.0 | 46.6 | 37.1 | 29.7 |
| Vinyl content/% | 59.5 | 62.5 | 63.0 | 62.1 | 62.6 | 62.2 |
| Styrene content/% | 21.8 | 21.3 | 21.4 | 21.2 | 21.3 | 20.8 |
| $M_L$/MU | 156.2 | 62.9 | 88.0 | 94.3 | 85.7 | 90.7 |

TABLE 2

Polymerisation 2.

| | G | H | I | J | K | L |
|---|---|---|---|---|---|---|
| Cyclohexane/g | 2354 | 2352 | 2452 | 2353 | 2352 | 2353 |
| Butadiene/g | 329.7 | 327.0 | 259.8 | 328.1 | 329.7 | 328.9 |
| Styrene/g | 87.2 | 87.0 | 70.2 | 87.0 | 87.1 | 87.2 |
| TMEDA/mmol | 4.88 | 4.85 | 3.88 | 4.79 | 4.08 | 4.08 |
| Initiator/mmol | NB 2.44 | NB 2.44 | NB 1.96 | NB 2.05 | NB 2.05 | NB 2.05 |
| BA/mmol | M1 0.75 | M1 1.26 | M1 2.34 | M5 8.12 | M6 2.05 | M7 8.19 |
| $SnCl_4$/mmol | — | — | — | — | — | — |
| Cpd 2f/mmol | 2.53 | 2.50 | 2.06 | 1.83 | 1.82 | 1.82 |
| Mp/kg/mol | 275 | 328 | 226 | 453 | 375 | 372 |
| Coupl. rate/% | 20.8 | 33.1 | 52.9 | | 16.9 | 45.1 |
| Vinyl content/% | 63.6 | 63.6 | 62.1 | 63.8 | 63.3 | 63.8 |
| Styrene content/% | 21.3 | 21.0 | 20.9 | 20.1 | 20.9 | 21.0 |
| $M_L$/MU | 39.8 | 77.4 | 53.1 | 75.5 | 75.3 | 89.3 |

TABLE 3

Polymerisation 3.

| | M | N | O | P | Q | R |
|---|---|---|---|---|---|---|
| Cyclohexane/g | 4113 | 4124 | 4109 | 4113 | 4118 | 3461 |
| Butadiene/g | 573.2 | 604.7 | 575.1 | 569.0 | 580.7 | 500.3 |
| Styrene/g | 154.7 | 156.4 | 152.4 | 153.4 | 155.5 | 130.5 |
| TMEDA/mmol | 5.78 | 7.17 | 7.09 | 7.19 | 7.44 | 6.09 |
| Initiator/mmol | NB 2.90 | NB 3.59 | NB 3.59 | NB 3.59 | NB 3.59 | L1 3.03 |
| BA/mmol | M8 1.55 | M9 1.83 | M10 1.83 | M11 1.98 | M12 3.12 | M12 0.67 |
| $SnCl_4$/mmol | — | — | — | — | — | — |
| Cpd 2f/mmol | 3.04 | 3.73 | 3.75 | 3.39 | 3.70 | 6.27 |
| Mp/kg/mol | 644 | 399 | 339 | 304 | 391 | 289 |
| Coupl. rate/% | | 23.8 | 6 | 30.2 | 51.4 | 31.3 |
| Vinyl content/% | 62.7 | 61.6 | 62.1 | 61.1 | 60.4 | 64.3 |
| Styrene content/% | 19.8 | 20.4 | 20.5 | 23.2 | 23.8 | 21.4 |
| $M_L$/MU | 108.5 | 88.8 | 55.8 | 65.1 | 126.4 | 65.6 |

TABLE 4

Polymerisation 4.

| | S | T | U | V | W | X | Y |
|---|---|---|---|---|---|---|---|
| Cyclohexane/g | 4138 | 2344 | 2517 | 2598 | 2503 | 2637 | 4118 |
| Butadiene/g | 571.9 | 311.9 | 282.8 | 143.1 | 258.4 | 290.6 | 598.3 |
| Styrene/g | 154.7 | — | — | 141.6 | 108.6 | 45.7 | 151.5 |

TABLE 4-continued

Polymerisation 4.

|  | S | T | U | V | W | X | Y |
|---|---|---|---|---|---|---|---|
| TMEDA/mmol | 7.37 | 62.4 | 1.07 | 0.21 | 4.06 | 0.95 | 7.21 |
| Initiator/mmol | NB 3.61 | NB 31.2 | NB 1.32 | NB 1.43 | NB 1.64 | NB 1.86 | NB 4.46 |
| BA1/mmol | M12 2.00 | M1 3.25 | M11 0.18 | M1 0.67 | M12 0.74 | M12 0.82 | M12 1.97 |
| BA2/mmol | — | M12 3.25 | — | — | — | M1 1.94 | — |
| Modifier/mmol | — | — | N 1.32 | P 1.42 | — | P 2.30 | 2f 3.66 |
| Mp/kg/mol | 295 | 20 | 486 | 257 | 533 | 474 | 347 |
| Coupl. rate/% | 50.5 | 29.8 | 54.8 | 22.5 | 37.1 | 29.3 | 44.8 |
| Vinyl content/% | 62.3 | 71.3 | 39 | 12.1 | 60.0 | 48.4 | 62.2 |
| Styrene content/% | 21.1 | 0 | 0 | 45.3 | 28.3 | 15.9 | 20.9 |
| $M_L$/MU | 83.5 | — | 118.7 | 79 | 119.5 | 151.9 | 78 |

TABLE 5

Polymerisation 5.

|  | Z | Lit Ref. 1 | Lit Ref. 2 | CompEx 1 | CompEx 2 | CompEx 3 |
|---|---|---|---|---|---|---|
| Cyclohexane/g | 4196 | 4740 | 4745 | 4652 | 4739 | 4111 |
| Butadiene/g | 571.9 | 660.6 | 661.4 | 698.5 | 660.5 | 574.9 |
| Styrene/g | 151.7 | 176.2 | 176.2 | 186.1 | 176.0 | 152.7 |
| TMEDA/mmol | 7.32 | 8.28 | 6.82 | 8.80 | 8.28 | 7.21 |
| Initiator/mmol | L1 3.59 | NB 4.14 | NB 3.35 | NB 4.39 | NB 4.14 | NB 3.59 |
| BA/mmol | M1 1.81 | S 1.68 | S 1.71 | — | DV 2.89 | Si 0.30 |
| $SnCl_4$/mmol | — | — | — | 0.31 | — | — |
| Cpd 2f/mmol | 3.76 | 4.20 | 3.41 | 3.76 | 4.21 | 3.68 |
| Mp/kg/mol | 295 | 287 | 384 | 337 | 311 | 386 |
| Coupl. rate/% | 40 | 2.7 | 2.4 | 22.5 | 37.1 | 29.3 |
| Vinyl content/% | 63.8 | 62.7 | 61.7 | 61.7 | 63.1 | 62.1 |
| Styrene content/% | 22.5 | 21.2 | 21.2 | 21.1 | 21.1 | 21.2 |
| $M_L$/MU | 69.9 | 39.3 | 77.4 | 58.1 | 81.0 | 97.8 |

NB = nBuLi,
2f = 3-Methoxy-3,8,8,9,9-pentamethyl-2-oxa-7-thia-3,8-disiladecane,
N = 3-Triethoxysilyl-1-propyl thiooctanoate,
P = (3-Chloropropyl) dimethoxy(methyl)silane,
L1 = product of reaction of 2 equiv. nBuLi with 1,3-bis[1-(4-(tert-butyl)phenyl)vinyl]benzene in presence of TMEDA,
S = N,N-Diethyl-1,1-dimethyl-1-vinylsilanamine,
DV = isomeric mixture of divinylbenzenes,
Si = $SiCl_4$
Comp. Ex. 4 = Commercial available functionalized SSBR grade SPRINTAN™ SLR 4602-Schkopau Storage Stability of Inventive Unfilled Polymers As shown in FIG. 1, the unfilled polymers of the invention exhibit an unusual, advantageous storage behavior. In contrast to most functionalized polymers, the unfilled polymers of the invention do not show a significant increase of Mooney viscosity at 25° C. (in air) over time. Without wishing to be bound by theory, it is assumed that the relatively labile Si—N bonds, owing to their chemical structure, provide a marginal reduction of the coupling rate (reflected by Mooney viscosity), depending on the molecular structure of the modifier, at increased storage times. As a result, the potential Mooney increase, resulting from oxygen-mediated coupling or slow crosslinking due to condensation reactions, can be balanced.

Formulation with Silica as Filler:

TABLE 6

Compound information 1.

|  | A | B | C | Lit. Ref. 1 | Comp. Ex 1 | Comp. Ex 2 |
|---|---|---|---|---|---|---|
| ML1 + 4 100° C. unmassed | 48.5 | 58.6 | 69.9 | 41.3 | 68.2 | 85.3 |
| CML1 + 4 | 116.4 | 89.2 | 97.5 | 82.1 | 91.6 | 122.6 |
| CML − ML | 67.9 | 30.6 | 27.6 | 40.8 | 23.4 | 37.3 |
| Mod300/MPa | 13.6 | 13.5 | 12.2 | 12.3 | 11.4 | 11.9 |
| Tensile strength/MPa | 17.8 | 17.7 | 19.5 | 19.9 | 19.3 | 20.1 |
| Rebound resilience @ 60° C./% | 68.8 | 67.3 | 67.2 | 65.8 | 62.5 | 63.0 |
| HBU/° C. | 103.5 | 100.4 | 106.7 | 105.6 | 110.9 | 110.6 |
| Tan δ 60° C. | 0.087 | 0.093 | 0.101 | 0.107 | 0.130 | 0.121 |
| DIN abrasion [mm³] | 133 | 124 | 129 | 129 | 130 | 128 |

Glass transition temperatures of polymers: A: −26.9° C., B: −22.3° C., C: −22.4° C., Lit. Ref. 1: −22.5° C., Comp. Ex. 2: −22.5° C.

The compound Mooney viscosity data (CML) of polymers A, B and C reflect different amounts of BA and therefore different levels of processability, i.e. the more BA has been utilized the higher are the CML data (but all lower than Comp. Ex. 2). Efficient polymer-filler interaction is reflected by improved Mod300 data for A and B compared with all references, the Mod300 for C is leveled with the references. In contrast, C shows leveled tensile strength with reference samples, whereas A and B exhibit slightly lower tensile strength values. With respect to hysteresis properties (HBU, Rebound Resilience @ 60° C., tan δ @ 60° C.), samples A and B show a clearly reduced hysteresis loss and therefore less undesirable heat dissipation compared with all references including the state of the art literature example Lit. Ref. 1 at same dosing amount of modifier. From these data, improved rolling resistance properties compared to Lit. Ref. 1, Comp. Ex 1 and Comp. Ex 2 can be anticipated. Sample C shows also improved hysteresis properties compared with Comp. Ex. 1 and Comp. Ex. 2, whereas C is leveled with Lit. Ref. 1. Dependent on the dosing amount of BA, ice grip (reflected by tan δ @ −10° C.) is improved with respect to all reference examples. The potential wear resistance reflected by DIN abrasion is on par for all six samples.

TABLE 7

Compound information 2.

|  | D*) | E*) | Lit. Ref. 2 | Comp. Ex 1 | Comp. Ex 3 |
|---|---|---|---|---|---|
| ML1 + 4 100° C. unmassed | 101.9 | 90.8 | 82.8 | 68.2 | 103.1 |
| CML1 + 4 | 93.9 | 91.6 | 103.4 | 90.5 | 106.3 |
| CML − ML | −8.0 | 0.8 | 20.6 | 22.3 | 3.2 |
| Mod300 − Mod100/MPa | 10.0 | 10.0 | 9.9 | 10.6 | 10.6 |
| Tensile strength/MPa | 20.2 | 21.0 | 18.8 | 20.1 | 21.1 |
| Elongation @ break/% | 439 | 448 | 407 | 426 | 432 |
| Rebound resilience @ 0° C./% | 12.7 | 13.7 | 13.3 | 12.4 | 13.2 |
| Rebound resilience @ rt/% | 35.1 | 37.2 | 36.7 | 34.8 | 35.1 |
| Rebound resilience @ 60° C./% | 59.6 | 61.9 | 63.9 | 59.9 | 60.7 |
| HBU/° C. | 113.4 | 111.8 | 108.9 | 115.1 | 114.2 |
| Tan δ −10° C. | 0.677 | 0.663 | 0.664 | 0.628 | 0.660 |
| Tan δ 0° C. | 0.445 | 0.445 | 0.435 | 0.470 | 0.418 |
| Tan δ 60° C. | 0.150 | 0.137 | 0.121 | 0.147 | 0.136 |
| DIN abrasion [mm$^3$] | 143 | 151 | 134 | 154 | 136 |

*)Comparative example with modifier according to U.S. Pat. No. 3,485,857
Glass transition temperatures of polymers: D: −22.6° C., E: −23.6° C., Lit. Ref. 2: −23.5° C., Comp. Ex. 3: −23.8° C.

Table 7 compares primary amine modifiers as disclosed in U.S. Pat. No. 3,485,857 with the Lit. and Comp. Ex. Hysteresis properties (HBU, Rebound resilience @ 60° C., tan δ @ 60° C.) are not improved by using primary amine based modifiers. With higher dosing of modifier M2 (4 mol M2/initiator for sample D), the hysteresis properties are even lower than the results obtained in example E (1.08 mol M3/initiator). Mechanical properties (Mod 300-Mod 100, elongation at break, tensile strength) for samples D and E were on par with Comp. Ex. 3.

TABLE 8

Compound information 3.

|  | P | R | Z | Comp. Ex 4 |
|---|---|---|---|---|
| ML1 + 4 100° C. unmassed | 72.2 | 128.3 | 76.4 | 66.1 |
| Mod300 − Mod100/MPa | 8.7 | 9.8 | 10.3 | 8.2 |
| Tensile strength/MPa | 21.1 | 16.0 | 19.6 | 18.8 |
| HBU/° C. | 112.1 | 106.9 | 103.5 | 115.1 |
| Rebound resilience @ 60° C./% | 61.1 | 61.6 | 62.2 | 60.7 |

TABLE 8-continued

Compound information 3.

|  | P | R | Z | Comp. Ex 4 |
|---|---|---|---|---|
| Tan δ −10° C. | 0.642 | 0.728 | 0.733 | 0.622 |
| Tan δ 0° C. | 0.404 | 0.455 | 0.422 | 0.403 |
| Tan δ 60° C. | 0.124 | 0.110 | 0.095 | 0.132 |
| DIN abrasion [mm$^3$] | 127 | 115 | 108 | 115 |

Glass transition temperatures of polymers: P: −22.9° C., R: −20.4° C., Comp. Ex. 4: −22.3° C.
Comp. Ex. 4 = Commercial available functionalized SSBR grade SPRINTAN™ SLR 4602-Schkopau With respect to mechanical properties, sample Z and especially sample P are superior to Comp. Ex 4 in tensile strength, whereas sample R shows a lightly lower tensile strength. Hysteresis properties (HBU, Rebound resilience @ 60° C., tan δ @ 60° C.) are improved for samples P, R and Z compared to Comp. Ex 4, following the order Z>R>P>>Comp. Ex 4, through which improved rolling resistance properties for fuel-efficient tires can be expected. Within the estimated standard deviation of DIN abrasion, all four samples can be judged to be on par.

Formulation with Carbon Black as Filler:

TABLE 9

Compound information 1.

|  | P | R | Z | Comp. Ex 4 |
|---|---|---|---|---|
| ML1 + 4 100° C. unmassed | 72.2 | 131.1 | 91.6[1)] | 63.4 |
| CML1 + 4 | 86.2 | 120.6 | 96.9 | 75.7 |
| Mod300 − Mod100/MPa | 8.2 | 9.3 | 8.2 | 8.3 |
| Tensile strength/MPa | 19.9 | 18.8 | 19.0 | 19.2 |
| HBU/° C. | 98.4 | 94.9 | 96.9 | 99.6 |
| Rebound resilience @ 60° C./% | 58.7 | 59.2 | 58.5 | 60.2 |
| Tan δ −10° C. | 1.269 | 1.443 | 1.379 | 1.240 |
| Tan δ 0° C. | 0.680 | 0.839 | 0.804 | 0.703 |
| Tan δ 60° C. | 0.139 | 0.122 | 0.138 | 0.170 |
| DIN abrasion [mm$^3$] | 164 | 172 | 163 | 162 |

[1)]ML1 + 4 for sample Z was measured shortly after polymer workup, whereas ML1 + 4 of sample Z in table 8 was determined six weeks later (reduced by approx. 15 MU), Comp. Ex. 4 = Commercial available functionalized SSBR grade SPRINTAN™ SLR 4602-Schkopau Processing behavior reflected by CML is slightly more challenging for sample P than for Comp. Ex 4, Z and especially R have even higher CML values, respectively, which indicates an efficient rubber-filler interaction. The mechanical properties tensile strength and Mod300-Mod100 are leveled for all samples. Hysteresis properties indicated by HBU and Rebound resilience @ 60° C. are on par for all samples, whereas tan δ @ 60° C. is significantly reduced i.e. improved for samples P, R and Z compared to Comp. Ex 4, especially for sample R. Owing to the slower tan δ @ 60° C. values for P, R and Z, reduced rolling resistance can be anticipated in applications such as tires. The DIN abrasion is leveled for all samples, i.e. abrasion resistance is not deteriorated in samples P, R and Z.

Mixing Recipe for Silica Compounds

| 1st mixing stage: | |
|---|---|
| SSBR | 80 |
| High cis 1,4-polybutadiene (BUNA ™ cis 132-Schkopau, Trinseo Deutschland GmbH) | 20 |
| Precipitated silica (Ultrasil 7000 GR, Evonik Industries) | 80 |
| Silane (SI 75, bis(triethoxysilylpropyl)disulfane, Evonik Industries) | 6.9 |
| Stearic acid (Cognis GmbH) | 1.0 |
| Antiozonant (Dusantox 6 PPD [N-(1,3-dimethylbutyl)-N'-phenyl-1,4-phenylenediamine], Duslo a.s.) | 2.0 |
| Zinc oxide (Grillo-Zinkoxid GmbH) | 2.5 |
| Ozone protecting wax (Antilux 654, Rhein Chemie Rheinau GmbH) | 1.5 |
| Softener (TDAE oil, VivaTec500, Hansen & Rosenthal KG) | 20 |
| Sulfur (Solvay AG) | 1.4 |
| Accelerator (TBBS, N-tert-butyl-2-benzothiazolesulfenamide, Rhein Chemie Rheinau GmbH) | 1.5 |
| DPG (diphenylguanidine, Vulkacit D, Lanxess AG) | 1.5 |

Mixing Recipe for Carbon Black Compounds

| 1st mixing stage: | |
|---|---|
| SSBR | 100 |
| IRB 8 | 50.0 |
| Stearic acid (Cognis GmbH) | 1.5 |
| Softener (TDAE oil, VivaTec500, Hansen & Rosenthal KG) | 15.0 |
| Sulfur (Solvay AG) | 1.75 |
| Accelerator (TBBS, N-tert-butyl-2-benzothiazolesulfenamide, Rhein Chemie Rheinau GmbH) | 1.0 |

Test Methods

The molecular weight analyses were carried out by SEC/RI using a HEWLETT PACKARD HP 1100. The eluent THF was degassed on line. The solvent flow rate was 1.0 ml/min. 100 µL of polymer solution were injected per analysis. The analyses were carried out at 40° C. The molecular weights were initially calculated based on a polystyrene calibration and given in the tables as polystyrene. The real molecular weights (SSBR molecular weights) can be determined dividing by a factor derived from an earlier comparison between molecular weights from SEC/RI and SEC/MALLS. The value of the factor depends on the polymer composition (styrene and butadiene content). A factor of 1.52 can be used for SSBR with 21% and 25% styrene. A factor of 1.84 can be used for SBR with 0% styrene. A factor of 1.56 can be used for SSBR with 16% styrene. A factor of 1.41 can be used for SSBR with 45% styrene.

NMR-spectroscopy was performed on a BRUKER Avance 400 in a 5 mm B130 probe. Solvents, frequencies and temperature are given in the characterization data.

FTIR-spectroscopy measured in attenuated total reflection was used to determine the vinyl content and styrene content.

The glass transition temperature was determined using the DSC Q2000 under the following conditions:
Weight: ca. 10-12 mg
Sample container: Alu/S
Temperature range: (−140 . . . 80) ° C.
Heating rate: 20 K/min respectively 5 K/min
Cooling rate: free cooling
Purge gas: 20 ml Ar/min
Cooling agent: liquid nitrogen Each sample was measured at least once. The measurements contain two heating runs. The 2nd heating run was used to determine the glass transition temperature.

Measurements of non-vulcanized rheological properties according to ASTM D 5289-95 were made using a rotor-less shear rheometer (MDR 2000 E) to characterize cure characteristics. Test pieces were vulcanized by t95 at 160° C., especially for hardness and rebound resilience tests the specimen were vulcanized by T95+5 min at 160° C. Tensile strength and moduli were measured according to ASTM D 412 on a Zwick Z010. DIN abrasion was measured according to DIN 53516 (1987-06-01). Hardness Shore A (ASTM D 2240) and Rebound resilience (ISO 4662) were measured at 0° C., RT and 60°. Dynamic properties as tan δ at 0° C. and 60° C. were measured using dynamic spectrometer Eplexor 150N/500N manufactured by Gabo Qualimeter Testanlagen GmbH (Germany) applying a compression dynamic strain of 0.2% at a frequency of 2 Hz. Heat build-up was measured according to ASTM D 623, method A, on a Doli 'Goodrich'-Flexometer.

The invention claimed is:

1. A multivinylaminosilane which is a compound selected from

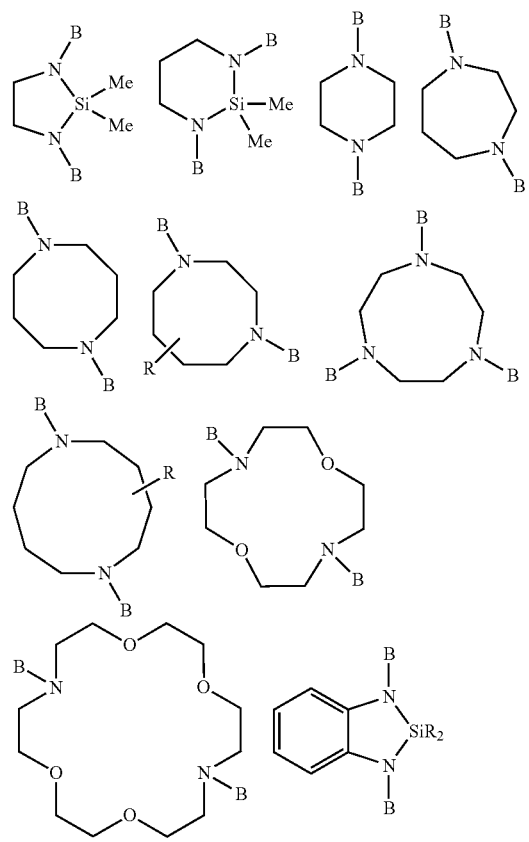

wherein each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, and R is a $C_1$-$C_6$ alkyl group;

or from one of Formulas 1-1, 1-3, 1-4 and 1-5:

(Formula 1-1)

wherein each of $R^{11}$, $R^{12}$, $R^{13}$, $R^{14}$ and $R^{15}$ is independently selected from $C_1$-$C_{18}$ alkyl, $C_6$-$C_{18}$ aryl, optionally $C_1$-$C_4$ alkyl-substituted $C_3$-$C_{12}$ heteroaryl, $C_7$-$C_{18}$ aralkyl, —Si($R^6$)($R^7$)($R^8$), wherein each of $R^6$, $R^7$ and $R^8$ is independently selected from methyl, ethyl, propyl, butyl, hexyl, octyl, phenyl and benzyl, and —Si($R^1$)($R^2$)($R^3$), wherein $R^1$, $R^2$ and $R^3$ are each independently selected from vinyl, butadienyl, butyl, hexyl, octyl and benzyl, with the proviso that at least one of $R^1$, $R^2$ and $R^3$ is selected from vinyl and butadienyl, and at least two of $R^{11}$, $R^{12}$, $R^{13}$, $R^{14}$ and $R^{15}$ are —Si($R^1$)($R^2$)($R^3$), each of $R^9$ and $R^{19}$ is independently selected from ethylene (—$C_2H_4$—), propylene (—$C_3H_6$—) and butylene (—$C_4H_8$—), phenylene and —($CH_2$)$_{a'}$—$C_6H_5$—($CH_2$)$_{b'}$—, wherein each of a' and b' is an integer independently selected from 0 and 1, and c is an integer selected from 0, 1, 2 and 3;

(Formula 1-3)

wherein each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, each of $R^{20}$, $R^{21}$ and $R^{22}$ is independently selected from a single bond and a $C_1$-$C_{10}$ alkylene group, d is an integer selected from 0, 1 and 2, and d' is an integer selected from 0 and 1, wherein d is 0 when d' is 0, and each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, and heteroatomic groups other than the two groups N and X expressly shown in Formula 1-3 are selected from —N=, >$NR^{16}$, —O—, —S— and >Si$R^{17}R^{18}$, wherein $R^{16}$ is selected from $C_1$-$C_6$ alkyl, group B as defined above, phenyl and benzyl, wherein each of $R^{17}$ and $R^{18}$ is independently selected from $C_1$-$C_6$ alkyl, phenyl and benzyl;

(Formula 1-4)

wherein each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, D is a 5- to 10-membered carbocyclic or heterocyclic group which may be saturated or unsaturated and which may be substituted on any carbon atom of the ring with a $C_1$-$C_6$ alkyl group, wherein in the heterocyclic group are selected from —N=, >$NR^{16}$, —O—, —S— and >Si$R^{17}R^{18}$, wherein $R^{16}$ is selected from $C_1$-$C_6$ alkyl, group B as defined above, phenyl and benzyl, and each of $R^{17}$ and $R^{18}$ is independently selected from $C_1$-$C_6$ alkyl and phenyl, each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, $R^{23}$ is selected from a single bond and a $C_1$-$C_{10}$ alkylene group, and e is an integer selected from 2, 3 and 4;

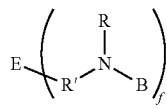

(Formula 1-5)

wherein each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, E is a 6- to 10-membered cycloaliphatic or aromatic group, each R' is independently selected from a single bond and $C_1$-$C_2$ alkylene, each R is independently selected from group B as defined above, $C_1$-$C_4$ alkyl and benzyl, and f is an integer selected from 2 and 3.

2. The multivinylaminosilane according to claim 1, wherein in Formula 1-1, each of $R^{11}$, $R^{12}$, $R^{13}$, $R^{14}$ and $R^{15}$ is independently selected from methyl and —Si($R^1$)($R^2$)($R^3$), wherein $R^1$, $R^2$ and $R^3$ are each independently selected from vinyl, butadienyl, ethyl, propyl, butyl, hexyl, octyl and benzyl, with the proviso that at least one of $R^1$, $R^2$ and $R^3$ is selected from vinyl and butadienyl; each of $R^9$ and $R^{19}$ is ethylene; c is an integer selected from 0, 1, 2 and 3; and at least two of $R^{11}$, $R^{12}$, $R^{13}$, $R^{14}$ and $R^{15}$ are —Si($R^1$)($R^2$)($R^3$).

3. The multivinylaminosilane according to claim 1, which is selected from

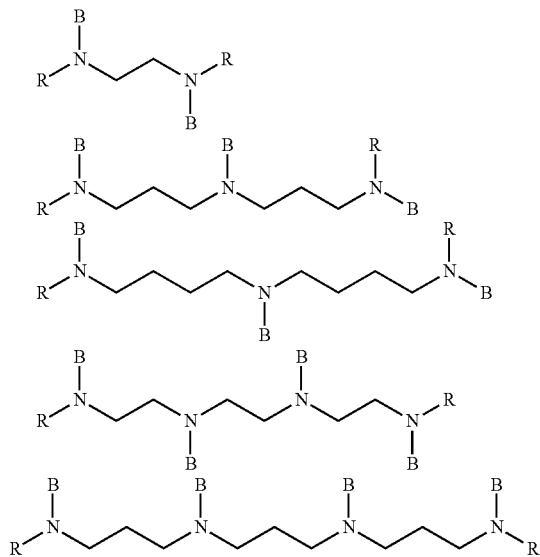

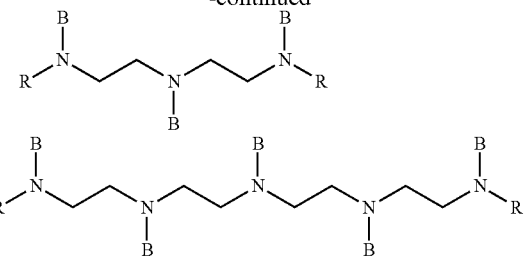

wherein each B is independently selected from —Si($R^1$)($R^2$)($R^3$), wherein $R^1$, $R^2$ and $R^3$ are each independently selected from vinyl, butadienyl, butyl, hexyl, octyl and benzyl, with the proviso that at least one of $R^1$, $R^2$ and $R^3$ is selected from vinyl and butadienyl, and each R is independently selected from B as defined above, $C_1$-$C_6$ alkyl and benzyl, and at least two of $R^{11}$, $R^{12}$, $R^{13}$, $R^{14}$ and $R^{15}$ are —Si($R^1$)($R^2$)($R^3$);

or from

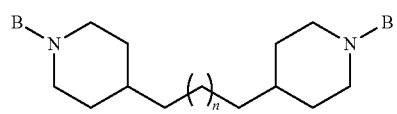

n = 0-2

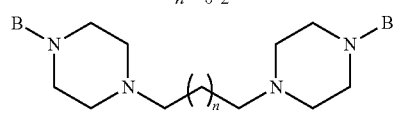

n = 0-2

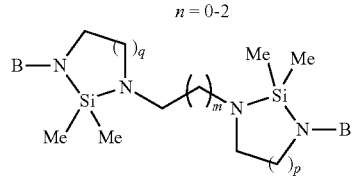

m = 1-3, p, q = 1 or 2

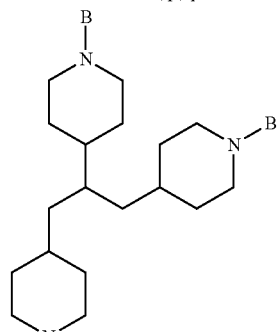

wherein each B is as defined above and at least two of $R^{11}$, $R^{12}$, $R^{13}$, $R^{14}$ and $R^{15}$ are —Si($R^1$)($R^2$)($R^3$).

4. The multivinylaminosilane according to claim 1, wherein in Formula 1-4 D is selected from cyclopentyl, cyclohexyl, phenyl and tetrahydrofuranyl; each group —N< >X— is selected from piperidinyl and piperazinyl; $R_{23}$ is a single bond; and e is an integer selected from 2 and 3.

5. The multivinylaminosilane according to claim 1, wherein in Formula 1-5 E is selected from cyclohexyl and phenyl; R' is a single bond; R is selected from group B as defined in claim 1, $C_1$-$C_4$ alkyl and benzyl; and f is an integer selected from 2 and 3.

6. A process for preparing the multivinylaminosilane as defined in claim 1, the process comprising reacting an amine with a silane of the following Formula 2 in the presence of a base:

$$X—Si(R^1)(R^2)(R^3) \quad \text{(Formula 2)}$$

wherein
X is selected from Cl, Br, I, trifluoromethanesulfonate (OTf) and tosylate (OTos),
$R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl; and
the amine is a compound having at least two groups independently selected from a primary amino group and a secondary amino group.

7. An initiator compound obtainable by reacting a multivinylaminosilane of the following Formula 1 with an organo-alkali metal compound $$(A)\text{-}B_n \quad \text{(Formula 1)}$$

wherein
A is an organic group having at least two amino groups,
each B is independently selected from a group —Si($R^1$)($R^2$)($R^3$), wherein $R^1$, $R^2$ and $R^3$ are each independently selected from vinyl, butadienyl, methyl, ethyl, propyl, butyl, hexyl, octyl, phenyl and benzyl, with the proviso that at least one of $R^1$, $R^2$ and $R^3$ is selected from vinyl and butadienyl, wherein each group B is a substituent of an amino group of group A,
at least two of the amino groups of group A are each substituted with at least one group B,
n is an integer of at least 2, and
all amino groups in group A are tertiary amino groups.

8. The initiator compound according to claim 7, wherein the organo-alkali metal compound is selected from methyllithium, ethyllithium, n-butyllithium, s-butyllithium, t-octyllithium, isopropyllithium, phenyllithium, cyclohexyllithium, 2-butyllithium, 4-phenylbutyllithium, t-butyldimethylsilyloxypropyllithium, dialkylaminopropyllithium, N-morpholinopropyllithium, sodium biphenylide, sodium naphthalenide and potassium naphthalenide.

9. The initiator compound according to claim 7, wherein the multivinylaminosilane is a compound selected from the following Formulas 1-1 to 1-5:

(Formula 1-1)

$$R^{11}-\underset{R^9}{\underset{|}{N}}-\underset{c}{\overset{R^{12}}{\underset{|}{}}}-\underset{R^{10}}{\underset{|}{N}}-\underset{}{\overset{R^{15}}{\underset{|}{}}}-\underset{}{\overset{R^{13}}{\underset{|}{N}}}-R^{14}$$

wherein
each of $R^{11}$, $R^{12}$, $R^{13}$, $R^{14}$ and $R^{15}$ is independently selected from group B as defined in claim 7, $C_1$-$C_{18}$ alkyl, $C_6$-$C_{18}$ aryl, optionally $C_1$-$C_4$ alkyl-substituted $C_3$-$C_{12}$ heteroaryl, $C_7$-$C_{18}$ aralkyl, and —Si($R^6$)($R^7$)($R^8$), wherein each of $R^6$, $R^7$ and $R^8$ is independently selected from methyl, ethyl, propyl, butyl, hexyl, octyl, phenyl and benzyl, and wherein at least two of $R^{11}$, $R^{12}$, $R^{13}$, $R^{14}$ and $R^{15}$ are group B,
each of $R^9$ and $R^{19}$ is independently selected from ethylene (—$C_2H_4$—), propylene (—$C_3H_6$—) and butylene (—$C_4H_8$—), phenylene and —$(CH_2)_{a'}$—$C_6H_5$—$(CH_2)_{b'}$—, wherein each of a' and b' is an integer independently selected from 0 and 1, and
c is an integer selected from 0, 1, 2 and 3;

(Formula 1-2)

wherein
group B is as defined in claim 7,
—N< >N— is a 5- to 18-membered heterocyclic group which may be saturated or unsaturated and which may be substituted on any carbon atom of the ring with a $C_1$-$C_6$ alkyl group, wherein heteroatomic groups, if present in the heterocyclic group, other than the two N atoms expressly shown in Formula 1-2 are selected from —N=, >$NR^{16}$, —O—, —S— and >$SiR^{17}R^{18}$, wherein $R^{16}$ is selected from group B as defined in claim 7, $C_1$-$C_6$ alkyl, phenyl and benzyl, and each of $R^{17}$ and $R^{18}$ is independently selected from $C_1$-$C_6$ alkyl, phenyl and benzyl;

(Formula 1-3)

wherein
group B is as defined in claim 7,
each of $R^{20}$, $R^{21}$ and $R^{22}$ is independently selected from a single bond and a $C_1$-$C_{10}$ alkylene group,
d is an integer selected from 0, 1 and 2, and d' is an integer selected from 0 and 1, wherein d is 0 when d' is 0,
each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—, and heteroatomic groups, if present in the heterocyclic group, other than the two groups N and X expressly shown in Formula 1-3 are selected from —N=, >NR¹⁶, —O—, —S— and >SiR¹⁷R¹⁸, wherein R¹⁶ is selected from $C_1$-$C_6$ alkyl, group B as defined in claim 7, phenyl and benzyl, and each of R¹⁷ and R¹⁸ is independently selected from $C_1$-$C_6$ alkyl, phenyl and benzyl;

(Formula 1-4)

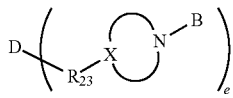

wherein
group B is as defined in claim 7,
D is a 5- to 10-membered carbocyclic or heterocyclic group which may be saturated or unsaturated and which may be substituted on any carbon atom of the ring with a $C_1$-$C_6$ alkyl group, wherein heteroatomic groups are selected from —N=, >NR¹⁶, —O—, —S— and >SiR¹⁷R¹⁸, wherein R¹⁶ is selected from $C_1$-$C_6$ alkyl, group B as defined in claim 7, phenyl and benzyl, each of R¹⁷ and R¹⁸ is independently selected from $C_1$-$C_6$ alkyl and phenyl,
each group —N< >X— is independently selected from a 5- to 10-membered heterocyclic group which may be saturated or unsaturated and which may be substituted on any carbon atom of the ring with a $C_1$-$C_6$ alkyl group, wherein each X is independently selected from —N—, —C= and —CH—,
R²³ is selected from a single bond and a $C_1$-$C_{10}$ alkylene group, and
e is an integer selected from 2, 3 and 4;

(Formula 1-5)

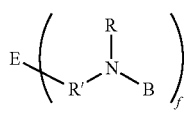

wherein
group B is as defined in claim 7,
E is a 6- to 10-membered cycloaliphatic or aromatic group,
each R' is independently selected from a single bond and $C_1$-$C_2$ alkylene,
each R is independently selected from group B as defined in claim 7, $C_1$-$C_4$ alkyl and benzyl, and
f is an integer selected from 2 and 3.

10. The initiator compound according to claim 9, wherein in Formula 1-1 each of R¹¹, R¹², R¹³, R¹⁴ and R¹⁵ is independently selected from group B as defined in claim 7 and methyl, each of R⁹ and R¹⁹ is ethylene, and c is an integer selected from 0, 1, 2 and 3.

11. The initiator compound according to claim 9, wherein the multivinylaminosilane is selected from

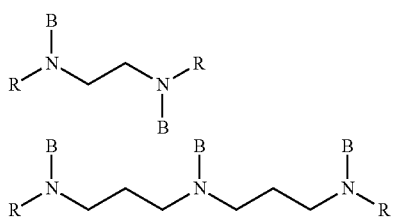

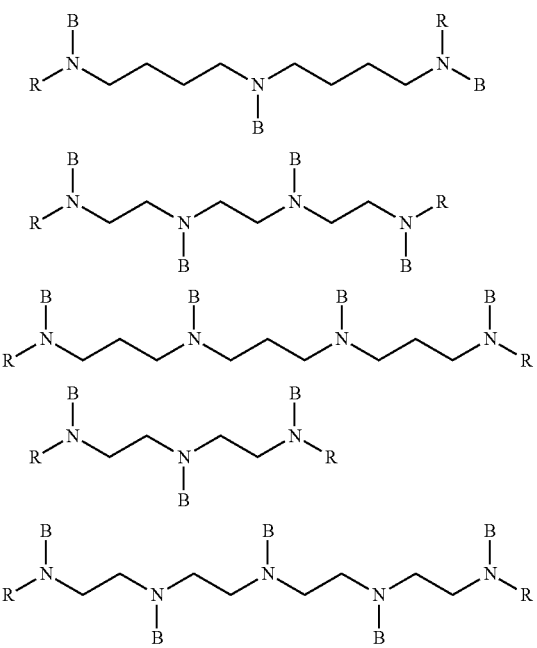

wherein group B is as defined in claim 7 and R is independently selected from group B, $C_1$-$C_6$ alkyl and benzyl;

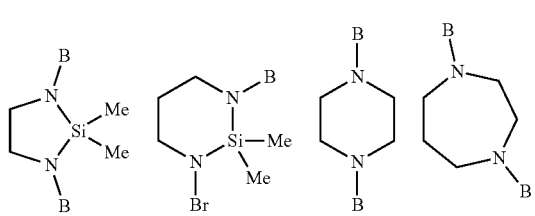

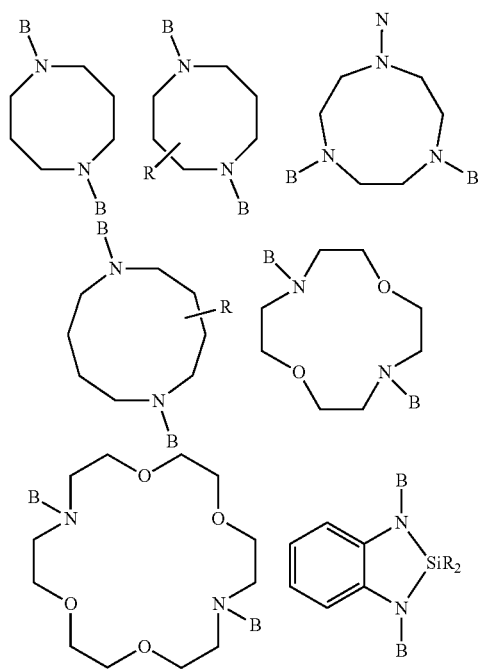

-continued

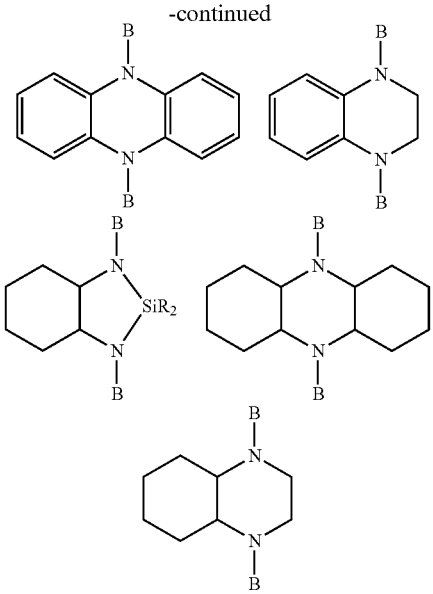

wherein R is a $C_1$-$C_6$ alkyl group and group B is as defined in claim 7; or

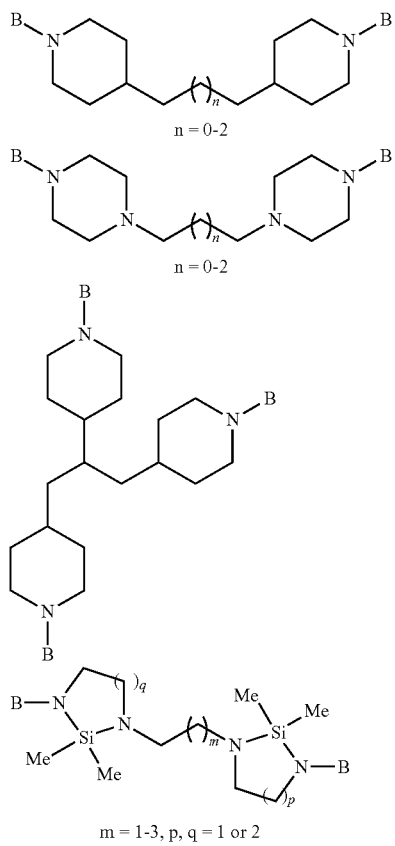

-continued

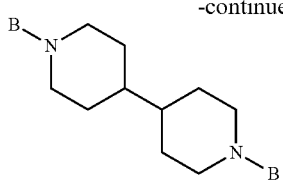

wherein B is as defined in claim 7.

12. The initiator compound according to claim 9, wherein in Formula 1-4 D is selected from cyclopentyl, cyclohexyl, phenyl and tetrahydrofuranyl; each group —N< >X— is selected from piperidinyl and piperazinyl; $R^{23}$ is a single bond; and e is an integer selected from 2 and 3.

13. The initiator compound according to claim 9, wherein in Formula 1-5 E is selected from cyclohexyl and phenyl; R' is a single bond; R is selected from group B as defined in claim 7, $C_1$-$C_4$ alkyl and benzyl; and f is an integer selected from 2 and 3.

14. A process for preparing a branched elastomeric polymer, the process comprising:
polymerizing at least one conjugated diene and a multivinylaminosilane of Formula 1 as defined in claim 7 in the presence of an initiator compound,
polymerizing at least one conjugated diene in the presence of an initiator compound according to claim 7, or
reacting a living polymer, obtainable by anionically polymerizing at least one conjugated diene, with a multivinylaminosilane of Formula 1 as defined in claim 7.

15. A branched elastomeric polymer obtainable by a process as defined in claim 14.

16. A non-vulcanized polymer composition comprising the branched elastomeric polymer as defined in claim 15 and one or more further components selected from (i) components which are added to or formed as a result of the polymerization process used for making the polymer, (ii) components which remain after solvent removal from the polymerization process, and (iii) components which are added to the polymer after completion of the polymer manufacturing process.

17. The non-vulcanized polymer composition according to claim 16 which comprises one or more fillers.

18. The non-vulcanized polymer composition according to claim 16, which comprises one or more vulcanizing agents.

19. A vulcanized polymer composition which is obtained by vulcanizing the non-vulcanized polymer composition as defined in claim 18.

20. An article comprising at least one component formed from the vulcanized polymer composition as defined in claim 19, wherein the article is selected from a tire, a tire tread, a tire side wall, a tire carcass, a belt, a gasket, a seal, a vibration damper, a footwear component, a golf ball and a hose.

21. A process for preparing a vulcanized polymer composition, the process comprising vulcanizing the non-vulcanized polymer composition as defined in claim 18.

* * * * *